United States Patent
Kempf et al.

(10) Patent No.: US 11,777,932 B1
(45) Date of Patent: Oct. 3, 2023

(54) CONTROLLING ACCESS TO INTERNET OF THINGS DEVICES USING VERIFIABLE CREDENTIALS

(71) Applicant: Equinix, Inc., Redwood City, CA (US)

(72) Inventors: James Kempf, Mountain View, CA (US); Rafael Lean de Vera Ansay, Singapore (SG); Oleg Berzin, Huntingdon Valley, PA (US)

(73) Assignee: EQUINIX, INC., Redwood City, CA (US)

( * ) Notice: Subject to any disclaimer, the term of this patent is extended or adjusted under 35 U.S.C. 154(b) by 337 days.

(21) Appl. No.: 17/100,399

(22) Filed: Nov. 20, 2020

Related U.S. Application Data

(60) Provisional application No. 62/939,432, filed on Nov. 22, 2019.

(51) Int. Cl.
 *H04L 9/40* (2022.01)
 *G16Y 30/10* (2020.01)
(52) U.S. Cl.
 CPC .......... *H04L 63/0876* (2013.01); *G16Y 30/10* (2020.01); *H04L 63/10* (2013.01); *H04L 63/20* (2013.01)
(58) Field of Classification Search
 CPC ..... H04L 63/0876; H04L 63/10; H04L 63/20; G16Y 30/10
 (Continued)

(56) References Cited

U.S. PATENT DOCUMENTS 9,886,267 B2 * 2/2018 Maheshwari ........... H04L 41/20
9,948,552 B2    4/2018 Teng et al.
(Continued)

FOREIGN PATENT DOCUMENTS

WO    WO-2017053048 A1 *  3/2017
WO       2019179535 A2    9/2019
WO    WO-2019204794 A1 * 10/2019  ............. G06F 21/31

OTHER PUBLICATIONS

Alzahrani et al., "An Informative-Centric Networking Based Registry for Decentralized Identifiers and Verifiable Credentials," IEEE Access, Jul. 24, 2020, Retrieved Dec. 22, 2021, pp. 137198-137208.
(Continued)

*Primary Examiner* — Kambiz Zand
*Assistant Examiner* — Aubrey H Wyszynski
(74) *Attorney, Agent, or Firm* — Shumaker & Sieffert, P.A.

(57) ABSTRACT

In general, this disclosure describes an IoT access control exchange for IoT devices. Verifiable credentials can be generated and used to grant access to IoT devices definitively identified using a Decentralized Identifier (DID). DIDs for IoT devices are registered by the IoT exchange hub acting as an Identity Hub. An organization interested in obtaining data from a collection of devices, the IoT Access Customer, contacts the IoT device owner agent via their mutual agents and obtains a verifiable credential with a request for access. The access request is submitted to the IoT exchange hub. The IoT exchange hub either enforces the access request itself if the devices do not have enough resources or submits the verifiable credential with the access request to the devices for them to enforce access. The IoT access customer agent, IoT device owner agent, and IoT exchange hub similarly identify themselves and prove authentication using DIDs.

20 Claims, 11 Drawing Sheets

(58) Field of Classification Search
USPC .......................................................... 726/4
See application file for complete search history.

(56) References Cited

U.S. PATENT DOCUMENTS

| | | | |
|---|---|---|---|
| 10,129,078 B2 | 11/2018 | Kumar et al. | |
| 10,320,795 B2* | 6/2019 | Samuel | H04L 63/10 |
| 10,454,927 B2* | 10/2019 | Oberhauser | G06F 21/62 |
| 11,281,658 B2* | 3/2022 | Jentzsch | H04L 9/3239 |
| 11,425,111 B2* | 8/2022 | Smith | G06F 21/74 |
| 2008/0052698 A1* | 2/2008 | Olson | G06F 8/658 |
| | | | 717/168 |
| 2015/0249672 A1* | 9/2015 | Burns | G06F 21/629 |
| | | | 726/4 |
| 2018/0343126 A1 | 11/2018 | Fallah et al. | |
| 2018/0343164 A1 | 11/2018 | Wylie et al. | |
| 2019/0230092 A1 | 7/2019 | Patel et al. | |
| 2019/0319808 A1* | 10/2019 | Fallah | H04L 9/3297 |
| 2020/0036707 A1 | 1/2020 | Callahan et al. | |
| 2020/0065763 A1 | 2/2020 | Rosinzonsky et al. | |
| 2020/0349276 A1 | 11/2020 | Murdoch et al. | |

OTHER PUBLICATIONS

Leucking et al., "Decentralized identity and trust management framework for Internet of Things," 2020 IEEE International Conference on Blockchain and Cryptocurrency (ICBC), May 2020, Retrieved Dec. 22, 2021, 9 pp.
U.S. Appl. No. 17/019,001, filed Sep. 11, 2020, naming inventors Kempf et al.
U.S. Appl. No. 17/112,588, filed Dec. 4, 2020, naming inventors Ansay et al.
"Ipfs/ipfs: Peer-to-Peer hypermedia protocol", GitHub, Retrieved: https://github.com/ipfs/ipfs, Accessed Apr. 14, 2021, 9 pp.
"DID Specification Registries," W3C Editor's Draft Apr. 2, 2021, Retrieved: https://w3c.github.io/did-spec-registries/#did-methods, Accessed Apr. 2, 2021, 44 pp.
Rein et al., "The Remote Attestation NFV Use Cases draft-rein-remote-attestation-nfv-use-cases-00," 2018 IETF Trust, Network Working Group: Internet Draft, Mar. 5, 2018, 11 pp.
"Network Functions Virtualisation (NFV) Release 3; Licensing Management; Report on License Management for NFV," ETSI GR NFV-EVE 010 V3.1.1, Dec. 2017, 31 pp.
"Network Functions Virtualisation (NFV)," ETSI, Retrieved Apr. 14, 2021 from: http://web.archive.org/web/20190420190232/https://www.etsi.org/technologies/nfv, Accessed Apr. 20, 2019, 18 pp.
"Home—DPDK," Linux Foundation, Retrieved Apr. 14, 2021 from: https://web.archive.org/web/20190515153922/https://www.dpdk.org/, Accessed May 15, 2019, 4 pp.
"Build the Future of Open Infrastructure," Openstack Foundation, Retrieved Apr. 14, 2021 from: https://web.archive.org/web/20190514161111/https://www.openstack.org/, Accessed May 14, 2019, 8 pp.
Reichert, "Ericsson: Expired certificate caused O2 and Softbank Outages," ZDNet, Retrieved Apr. 14, 2021 from: https://web.archive.org/web/20190524042438/https://www.zdnet.com/article/ericsson-expired-certificate-caused-o2-and-softbank-outages/, Accessed May 24, 2019, dated Dec. 6, 2018, 4 pp.
"A Primer for Decentralized Identifiers," Decentralized Identity Foundation, Retrieved Apr. 14, 2021 from: https://w3c-ccg.github.io/did-primer/, Accessed May 19, 2019, dated Dec. 29, 2020, 8 pp.
Sabadello, "A Universal Resolver for self-sovereign identifiers," Retrieved Apr. 14, 2021, from: https://medium.com/decentralized-identity/a-universal-resolver-for-self-sovereign-identifiers-48e6b4a5cc3c, Accessed May 16, 2019, dated Nov. 1, 2017, 5 pp.
"Decentralized Identifiers (DIDs) v0.12," W3C, Retrieved Apr. 14, 2021, from: http://web.archive.org/web/20190523111828/https://w3c-ccg.github.io/did-spec/, Accessed May 23, 2019, 45 pp.
"RSA Signature Suite 2018" W3C, Retrieved Apr. 14, 2021, from: https://web.archive.org/web/20190725234817/https://w3c-dvcg.github.io/lds-rsa2018/, Accessed Jul. 25, 2019, 5 pp.
"Linked Data Signatures 1.0," W3C, Retrieved Apr. 14, 2021, from: https://web.archive.org/web/20190709115729/https://w3c-dvcg.github.io/ld-signatures/, Accessed Jul. 9, 2019, 14 pp.
"Decentralized Identity: Own and control your identity," Microsoft, Retrieved Apr. 14, 2021, from: https://web.archive.org/web/20190527123600/https://query.prod.cms.rt.microsoft.com/cms/api/am/binary/RE2DjfY, Accessed May 27, 2019, 23 pp.
"Verifiable Credentials Data Model 1.0," Retrieved Apr. 14, 2021, from: https://www.w3.org/TR/vc-data-model/, Nov. 19, 2019, 122 pp.
"Sidetree Entity Protocol," Github, Retrieved Apr. 14, 2021, from: https://github.com/decentralized-identity/did-methods/blob/master/sidetrees/explainer.md, last updated Apr. 7, 2018, 10 pp.
Buchner, "The Sidetree Protocol: Scalable DPKI for Decentralized Identity," Retrieved Apr. 14, 2021, from: https://medium.com/decentralized-identity/the-sidetree-scalable-dpki-for-decentralized-identity-1a9105dfbb58, Feb. 27, 2019, 6 pp.
"Decentralized-identity/secure-data-store," Github, Retrieved Apr. 14, 2021 from: https://web.archive.org/web/20201107153954/https://github.com/decentralized-identity/secure-data-store, Accessed Nov. 7, 2020, 2 pp.
"Decentralized Identifiers (DIDs) v0.13: Data Model and Syntaxes," W3C, Retrieved Apr. 14, 2021, from: https://web.archive.org/web/20190619085145/https://w3c-ccg.github.io/did-spec/, Accessed Jun. 19, 2019, 45 pp.
Wright et al., "JSON Schema: A Media Type for Describing JSON Documents: draft-handrews-json-schema-02," Internet Engineering Task Force: Internet-Draft, Sep. 16, 2019, 75 pp.
Roman et al., "On the features and challenges of security and privacy in distributed internet of things," Computer Networks, vol. 57, Issue 10, Jul. 5, 2013, 14 pp.

* cited by examiner

```
"$schema" : "http://json-schema.org/draft-07/schema#",
"type" : "object",
"properties" : {
        /*The subject of the credential is the IoT Access Customer Agent, and is identified by a DID.*/
        "id" : { "type" : "string",
                 "format" : "uri"
           }
        "accessRequest" : { "type" : "object",
                            "properties" : {
                                /*An array of DIDs identifying the IoT Devices by their DIDs.*/
                                "deviceIds" : { "type" : "array",
                                                "items" : { "type" : "string",
                                                            "format" : "uri"
                                                          },
                                                "minItems:" : 1
                                              }
                                /*Starting date and time for access.*/
                                "start" : { "type" : "string",
                                            "format" : "date-time"
                                          }
                                /*Ending date and time for access.*/
                                "end" : { "type" : "string",
                                          "format" : "date-time"
                                        }
                                /*Periodicity of access.*/
                                "period" : { "type" : "string",
                                             "format" : "time"
                                           }
                                /*Permission request. Either "data" (i.e. read data from device, "control"
                                 (i.e. write control commands to the device), or "data" and "control"
                                 (do both).*/
                                "permissions" : { "type" : "array",
                                                  "items" : { "enum" :
                                                                ["data", "control"]
                                                            },
                                                  "minitems" : 1,
                                                  "maxitems" : 2
                                                },
                                /*If privacyPreserving is true, the IoT Exchange acts sets up a filter pipeline,
                                  processing any data or control stream to remove any messages that may
                                  compromise privacy.*/
                                "privacyPreserving" : boolean
                            }
                          }
}
```

FIG. 6

CONTROLLING ACCESS TO INTERNET OF THINGS DEVICES USING VERIFIABLE CREDENTIALS

This application claims the priority benefit of U.S. Provisional Patent Application Ser. No. 62/939,432, filed Nov. 22, 2019, the entire contents of which is incorporated herein by reference.

TECHNICAL FIELD

The disclosure relates to computer networks and, more specifically, to a controlling access to IoT devices using verifiable credentials.

BACKGROUND

Enterprises are increasingly making use of "smart" devices, i.e., physical objects that contain embedded technology configured to provide some degree of computing intelligence. These smart devices may communicate and sense or interact with their internal states or the external environment. The "Internet of Things" ("IoT") refers to a network of these smart devices ("IoT devices"). These devices may be distributed across broad geographical areas. IoT devices are deployed for various applications, such as health monitoring applications, or traffic control applications, where security and reliability of device identification, registration, and software installation can be of critical importance.

According to currently available technology, secure device identification and access to devices is typically driven by use of digital certificates (e.g., X.509 certificates) and Public Key Infrastructure (PKI). Centralized identity management mechanisms, such as PKI, generally use a centralized trust anchor, sometimes referred to as a certificate authority (CA), issuing credentials attesting to the validity of keying material. Cloud computing systems typically depend on a centralized database containing the credentials and identity that users employ to authenticate, and access control information about what resources customers are allowed to access. As the deployment of connected IoT devices are exponentially increasing, the use of centralized identity management mechanisms can lead to various technical problems. For example, ensuring the security of access to such a large collection of devices is a technical problem, primarily due to the scale of the network of IoT devices. In particular, techniques of identity management and authorization that are used in enterprise and carrier IT systems are not sufficient given the scale. Other technical problems include ensuring performance, interoperability, security, and privacy, for example.

SUMMARY

In general, this disclosure describes an IoT access control exchange. Verifiable Credentials (VCs) can be generated and used to grant access to IoT devices definitively identified using a Decentralized Identifier (DID). IoT devices register a DID for themselves or are registered by the IoT exchange hub acting as an Identity Hub. An organization interested in obtaining data from a collection of devices, the IoT access customer, contacts the IoT device owner via their mutual agents and obtains a verifiable credential with a request for access. The access request is submitted to the IoT exchange hub. The IoT exchange hub either enforces the access request itself if the devices do not have enough resources or submits the verifiable credential with the access request to the devices for them to enforce access. The IoT access customer agent, IoT device owner agent, and IoT exchange hub similarly identify themselves and prove authentication using DIDs.

The aspects described above, and further aspects described herein may provide one or more technical advantages that present at least one practical application. For example, the techniques described herein provide technical solutions to the technical problem of providing scalable access control to IoT devices. In some aspects, the technical solution includes using an authorization mechanism using verifiable credentials that are not dependent on a centralized authorization server for storing the permissions for authenticated parties. The use of verifiable credentials according to the techniques described herein can be implemented in an IoT exchange hub that provides a practical application that facilitates scalability. A further practical application provided by the techniques described herein is that enforcement of the permissions can be distributed among IoT devices or through the IoT exchange hub if the IoT devices do not have the resources to handle enforcement. Thus, the techniques described herein can provide an advantage over conventional systems by providing a more scalable design, and one that may allow IoT access customer agents who are not the owners of the devices to obtain data from, and send control commands to, IoT devices in a data marketplace.

In one example, a system includes an IoT device owner agent configured to manage access to a plurality of IoT devices; an IoT access customer agent configured to provide to the IoT device owner agent an access request to access one or more of the plurality of IoT devices, the access request including one or more request properties, the one or more request properties including a privacy preserving parameter, wherein in response to the access request, the IoT device owner agent is configured to receive an identifier for a verifiable credential, format the verifiable credential in accordance with the one or more request properties, and provide the verifiable credential to the IoT access customer agent; and an IoT exchange hub configured to: receive a request for an identifier for the verifiable credential from the IoT device owner agent, allocate the verifiable credential, and provide the identifier of the verifiable credential to the IoT device owner agent.

In one example, an Internet of Things (IoT) exchange hub includes one or more processors; and a computer-readable medium having instructions that, when executed, cause the one or more processors to: receive, from an IoT access customer agent, a verifiable credential in a request to access an IoT device, the request comprising a data stream request or a control stream request, authenticate a device identifier associated with the IoT access customer agent, verify the verifiable credential, and in response to a determination that the verifiable credential is valid and the device identifier is valid, provide a control stream source location or a data sink location to the IoT device.

In one example, an IoT device owner agent includes one or more processors; and a computer-readable medium having instructions that, when executed, cause the one or more processors to: receive, from an IoT access customer agent, a request to access one or more IoT devices managed by the IoT device owner agent, request, from an IoT exchange hub in response to the request, an identifier for a verifiable credential, receive, from the IoT exchange hub, the identifier for the verifiable credential, and format the verifiable credential in accordance with one or more properties in the request to access the one or more IoT devices.

In one example, a method includes receiving, from an IoT access customer agent, a verifiable credential in a request to access an IoT device, the request comprising a data stream request or a control stream request, authenticating a device identifier associated with the IoT access customer agent, verifying the verifiable credential, and in response to a determining that the verifiable credential is valid and the device identifier is authentic, providing a control stream source location or a data sink location to the IoT device.

The details of one or more examples are set forth in the accompanying drawings and the description below. Other features, objects, and advantages will be apparent from the description and drawings, and from the claims.

BRIEF DESCRIPTION OF DRAWINGS

FIG. 6 is an example data structure for a verification credential according to techniques described herein.

Like reference characters denote like elements throughout the figures and text.

DETAILED DESCRIPTION

Figure 1:
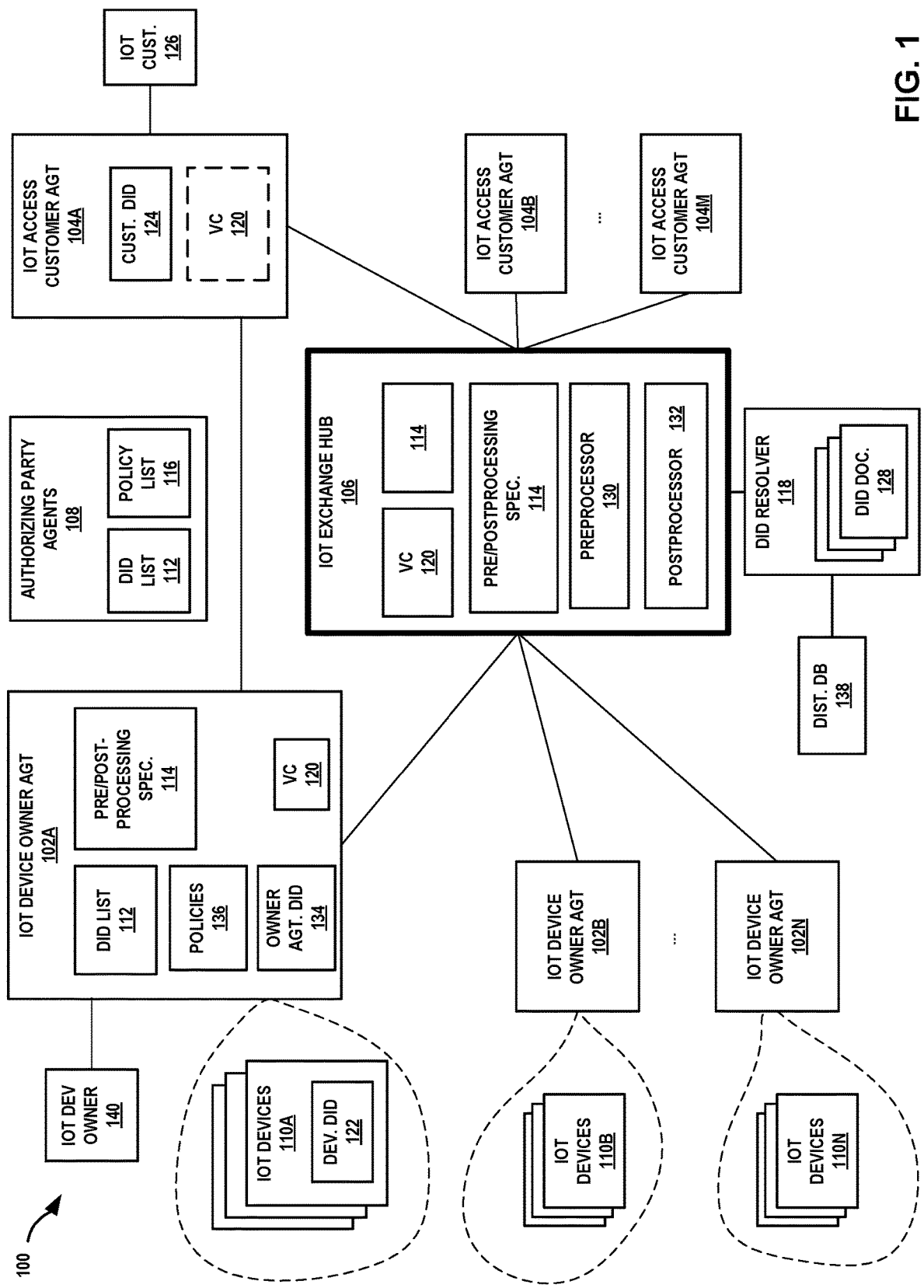
FIG. 1 is a block diagram that illustrates a conceptual view of an IoT access control system according to techniques described herein.

FIG. 1 is a block diagram that illustrates a conceptual view of an IoT access control system 100 according to techniques described herein. In some aspects, system 100 includes an IoT exchange hub 106, IoT device owner agents 102A-102N (referred to herein generally as "IoT device owner agent 102") and IoT access customer agents 104A-104M (referred to herein generally as "IoT access customer agent 104") communicably coupled with each other via one or more networks. An IoT device owner agent 102 may manage access for one or more IoT devices 110. In addition, IoT access control system 100 may include a Decentralized Identifier (DID) resolver 118 and authorizing party agents 108.

As noted above and as shown in FIG. 1, various components may be assigned, and/or may make use of, a Decentralized Identifier (DID). In some aspects, a DID may have a Universal Resource Name (URN) format as shown below:
   did:method:123abc The initial "did" field identifies the URN as belonging to a decentralized identifier scheme. The "method" field identifies the DID method used to define the DID and to identify a DID document type. For example, DID methods may include Microsoft ION (e.g., "did:ion:"), Sovrin (e.g., "did:sov:"), Bitcoin (e.g., "did:btcr:"), InterPlanetary File System (IPFS) (e.g., "did:ipid:"), and other decentralized, content-addressable data stores and/or consensus networks. Additional examples of DID methods are further described in Draft Community Group Report 10 Jun. 2019, Credentials Community Group (W3C), available at https://w3c-ccg-.github.io/did-method-registry/, the entire contents of which is incorporated by reference herein. The "123abc" is the actual unique identifier associated with one or more devices such as IoT device owner agent 102, IoT access customer agent 104, authorizing party agents 108, IoT devices 110 and IoT customer devices 126. In some examples, a DID is typically generated by computing a hash of a public key or a hash of a DID document associated with the DID.

A DID may be used for obtaining a DID document 128 that contains information for cryptographically verifying the identity of an entity (e.g., IoT devices 110, IoT customer devices 126 etc.) that registered the DID and establishing secure communication with the entities. In the example of FIG. 1, DID documents 128 may be stored within a distributed database 138. The distributed database 138 can include distributed ledgers such as block-chain ledgers and/or a decentralized data store (not shown). For example, DID documents 128 may be stored within distributed ledgers based on a DID method (e.g., Sovrin). DID resolver 118 may resolve a DID to an associated DID document 128 stored in distributed ledgers or in a decentralized data store. DID resolver 118 may include plug-ins (e.g., DID drivers) for one or more of the DID methods as described above to lookup and resolve DIDs to associated DID documents stored in distributed ledgers.

In some examples, a DID document 128 may be a JavaScript Object Notation for Linked Data (JSON-LD) document. A DID document 128 includes the DID to which the DID document 128 applies, called the "DID subject." In some examples, the DID document 128 may include an array of public key records including public keys used for authenticating, authorizing updates to the DID document 128, or establishing a secure communication with service endpoints. The DID document 128 may also include an array of authentication methods to use when communicating with the DID subject, and one or more proof methods to establish the authenticity of the DID document 128 (e.g., that the DID document has not been tampered with). Additional examples of DIDs and DID documents are further described in "Decentralized Identifiers (DIDs) v0.13," Credentials Community Group (W3C), available at https://w3c-ccg.github-b.io/did-spec/, the entire contents of which is incorporated by reference herein. Further examples are also described in U.S. Provisional Application No. 62/908,976 titled "Virtualized Network Functions Verification using Decentralized Identifiers," the entire contents of which is incorporated by reference herein.

A DID that identifies an IoT device 110 will be referred to herein as a device DID 122. A DID that identifies an IoT access customer agent 104 will be referred to herein as a customer DID 124. A DID that identifies an IoT device owner agent 102 will be referred to herein as an owner agent DID 134.

Further, as noted above and as shown in FIG. 1, entities within the IoT access control system 100 may create and maintain verifiable credentials 120. In some aspects, a verifiable credential 120 may be used to provide a credential that can be used for on-line transactions between entities in a way that allows the credential to be cryptographically verified, preserves privacy by only allowing information related to the transaction to be exposed, and is machine readable. In some aspects, a verifiable credential 120 may be a JSON-LD formatted document containing information about a DID subject (e.g., the DID to which a DID document 128 applies) which can be cryptographically verified. An example of a verifiable credential is shown in FIG. 6.

Referring to FIG. 6, an example portion 600 of a verifiable credential 120 is shown having properties used to implement the techniques described herein. For example, verifiable credential 120 includes an "id" property that contains an identifier for the verifiable credential document. The identifier may specify an object, such as an IoT access customer agent 104 or other entities within IoT access control system 100. The "id" property may be a Uniform Resource Identifier (URI). Verifiable credential 120 may also include an "accessRequest" property. The accessRequest property may include properties that are used to define an access request that can be used to request access to an IoT device 110. In some aspects, these properties may include various combinations of one or more of a "deviceids" property, a "start" property, an "end" property, a "periodicity" property, a "permissions" property, and a "privacyPreserving" property. The "deviceids" property is a list of device identifiers (e.g., DIDs) identifying IoT devices 110 for which access is requested. The "start" property defines a start time for which access to the IoT device 110 is to begin. The "end" property defines an end time for which access to the IoT device 110 is to end. The "periodicity" property defines a period for the access (e.g., every second, every minute, every ten minutes, every hour, every day etc.). The "permissions" property defines whether the request is for receiving data in a data stream from the IoT device 110, sending control commands in a control stream to the IoT device 110, or both. The "privacyPreserving" property defines whether or not privacy is to be preserved for the data stream received from an IoT device 110 or control stream sent to an IoT device 110.

A verifiable credential 120 may also include a signature property specifying a digital signature that can be used to sign the verifiable credential 120, for example, using a public or private key. Additional examples of verifiable credentials and properties that may be included in a verifiable credential 120 are described in "Verifiable Credentials Data Model 1.0," available at https://www.w3.org/TR/vc-data-model/, the entire contents of which is incorporated by reference herein.

A verifiable credential 120 may be stored in a data store or a trust issuer, that safely and securely stores semantic data objects. As one example, a data store may be a Decentralized Identity Foundation (DIF) Identity Hub as described in W3C, "DIF Identity Hubs," available at https://github.com/decentralized-identity/identity-hub/blob/master/explainer.md, the entire contents of which is incorporated by reference herein.

Returning to FIG. 1, IoT access customer agent 104 can receive a request from an IoT customer device 126 to access specific IoT devices 110 periodically over a specified time period. For example, the request may be entered by a person through a Web interface in a browser provided by the IoT access customer agent 104, where the person fills out an on-line form indicating which devices, for what time interval and period, and what sort of access (i.e. control or data). This request specification processed by the IoT access customer agent 104 which conducts the negotiation, on the customer's behalf, with the IoT device owner agent 102 and the IoT exchange hub 106 to obtain a verifiable credential 120 to authorize access to the devices.

IoT device owner agent 102 negotiates with the IoT access customer agent 104 for a verifiable credential 120 to authorize device access. The IoT device owner agent 102 accepts an access request from the IoT access customer agent 104. The IoT device owner agent 102 checks with authorizing party agents 108 to determine if their policy allows the IoT access customer agent 104 to access the IoT devices 110. If the access is allowed, the IoT device owner agent formats the access request into a verifiable credential 120 and returns the verifiable credential 120 to the IoT access customer agent 104. In some aspects, the IoT device owner agent 102 is associated with a group of IoT devices managed by a particular entity. As examples, an entity can be a governmental unit (e.g., state, county, city), a department with a governmental unit (e.g., police department, public works department), a company, a division within a company, etc. An entity responsible for a group of IoT devices 110 can establish, via an IoT device owner 140 device, various policies 136, pre/postprocessing specifications 114 and DID lists 112 that can be used to determine if access to IoT devices 110 managed by the entity is to be allowed.

In the example illustrated in FIG. 1, multiple IoT device owner agents 102A-102N manage access for respective groups of IoT devices 110A-110N. For instance, each IoT device owner agent 102 may be associated with a different IoT device owner 140. An IoT device 110 need not be directly accessible to the IoT device owner agent 102 that manages access for the IoT device. Similarly, multiple IoT access customer agents 104A-104M may desire access to the IoT devices 110A-110N. Each IoT access customer agent 104 may be associated with a different IoT customer and/or IoT customer device 126.

IoT exchange hub 106 functions as a hub where IoT device owners 140 can choose the IoT exchange hub 106 to orchestrate commissioning and provisioning of the IoT devices 110, and where access control to the IoT devices 110 can be enforced. IoT access customer agents 104 and IoT device owner agents 102 may register with IoT exchange hub 106 prior to using services provided by the IoT exchange hub 106. Further details on the operation of IoT exchange hub 106 are provided below.

In some aspects, authorizing party agents 108 provide authorization services to IoT device owner agent 102. In some cases, the IoT device owner agent 102 may request public key signatures from one or more other parties before issuing a verifiable credential 120 authorizing access. The authorizing party agents 108 can check a request against the policy of the authorizing party (e.g., IoT device owner agent 102), and sign the verifiable credential 120 if the request adheres to the policy. In some aspects where multiple parties authorize a request, a multisignature may be used.

IoT Devices 110 can be various sensors, effectors, cameras, etc. with connections to the Internet that measure something or take a control command to perform some action through their Internet connection. Commissioning, provisioning, and access control to the devices may be handled by the IoT exchange hub 106.

The IoT device owner agent 102 and authorizing party agents 108 maintain a DID list 112 of DIDs that are permitted to access the IoT devices 110 without any privacy preserving pre/post processing. Each IoT device 110 may have the potential to compromise privacy. IoT exchange hub 106 maintains collection of preprocessors 130 and postprocessors 132 that are filters through which a control stream or data stream is directed. The preprocessors 130 and postprocessors 132 can remove from the data stream or control stream data that may compromise privacy. For example, a traffic light camera may compromise privacy by exposing the face of the driver and their license plate, so any traffic light camera data streams need to be filtered to remove these identifying characteristics before being sent to customers that are not authorized for privacy compromising traffic photos. As an example, the DID for the municipal police department may be on the authorization DID list 112 because they are allowed to view the full stream, as a law enforcement agency, while a third party such as a university or company that desires to obtain the data may not be on the DID list 112, resulting in their data being filtered by the IoT exchange hub 106.

The IoT device owner agent 102 maintains a pre/postprocessing specification 114 that identifies a set of preprocessing and postprocessing filters that are to be applied if the "privacyPreserving" property indicates that privacy is to be preserved in data streams and control streams for an IoT device. As an example, the entries of can be have a BNF as follows:

<pre/postprocessing-spec>=<pre/postprocessing-entry>|<pre-postprocessing-entry>
    <pre/postprocessing-list>
    <pre/postprocessing-entry>=<DID-list>":"<filter-list>
    <DID-list>=DID|DID<DID-list>
    <filter-list>=filter|filter<filter-list> where "filter" is a program that takes a control and/or data stream as its input, removes privacy compromising elements from the data stream or control stream and writes the resulting filtered stream to the filter output, and "DID" is the DID of a device. The details of what the program removes, obscures, or obfuscates may be dependent on the type of IoT device 110 and what kind of data or control it generates or accepts.

The IoT device owner agent 102 may provide the pre/postprocessing specification to IoT exchange hub 106 as part of a registration process when the IoT device owner agent 102 registers with the IoT exchange hub 106. The IoT exchange hub 106 can run streams from/to the device through each filter program (e.g., postprocessors 132 or preprocessors 130) specified in the pre/postprocessing specification 114 in succession prior to sending the data to the IoT access customer agent 104, for data access, or sending the control stream to an IoT device 110 on the DID list 112, for control access.

The authorizing party agents 108 maintain a policy list 116, of DIDs for organizations whose requests for either data accessor control access or both may be categorically denied by the IoT device owner agent 102. This policy may be the result of specific rules put in place by an authorizing party associated with IoT access customer agent 104 or may be legal requirements from a larger legal jurisdiction, like a state's privacy law.

In addition to the access control aspects described above, in some aspects, the IoT exchange hub 106 can provide a catalog or directory of available IoT devices 110 and associated services to an IoT access customer agent 104. The IoT access customer agent 104 can use the catalog or directory to determine which IoT devices 110 are of interest and identifying information (e.g., DID, IP address) of the IoT device owner agent 102 that manages the IoT devices of interest.

FIGS. 2A-2D are sequence diagrams illustrating example operations performed by components of the IoT access control system 100 according to techniques described herein.

Figure 2A:
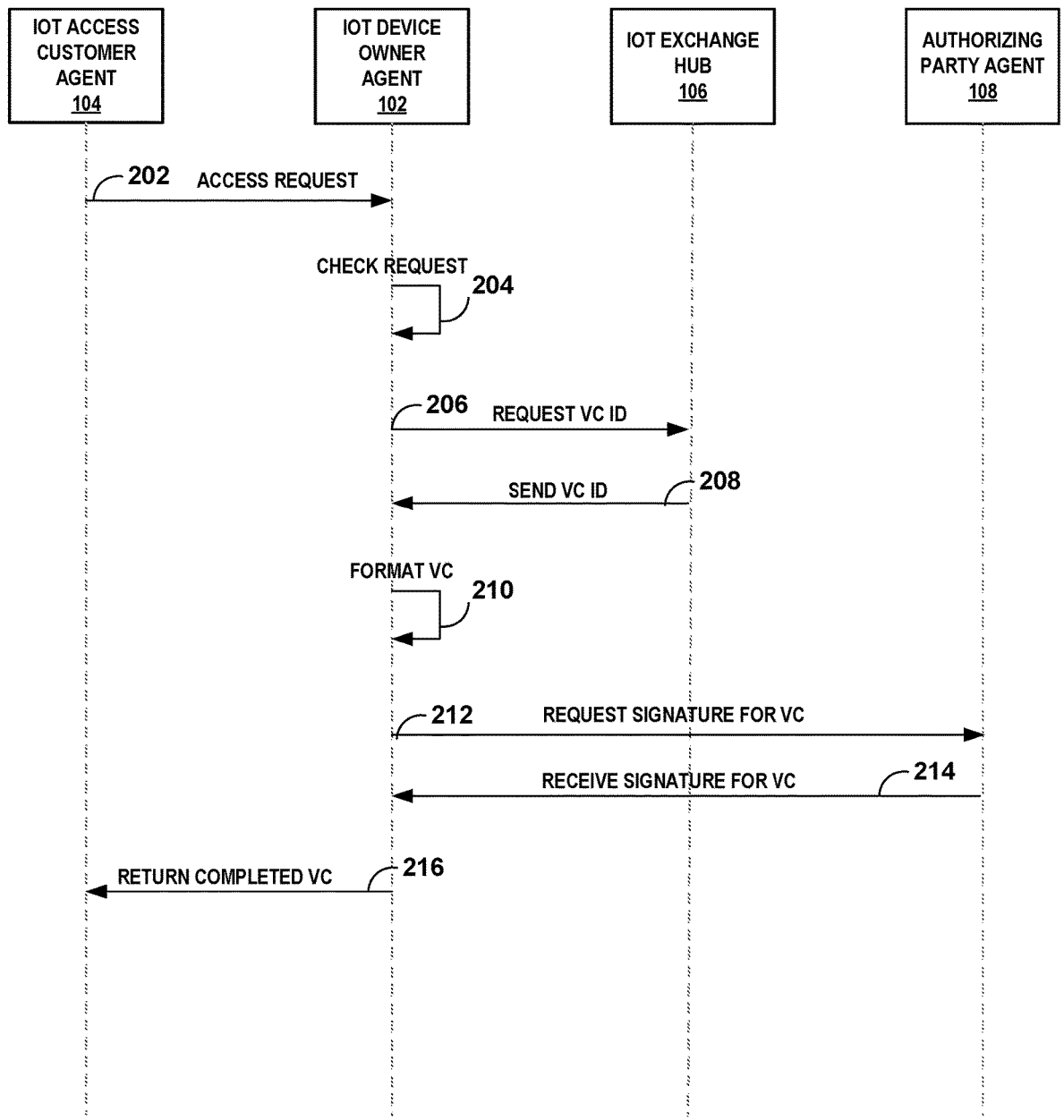
FIGS. 2A-2D are sequence diagrams illustrating example operations performed by components of the IOT data exchange system illustrated in FIG. 1 according to techniques described herein.

FIG. 2A is a sequence diagram illustrating example operations where an IoT access customer agent 104 obtains a verifiable credential for access to a collection of IoT devices 110. The IoT access customer agent 104 starts with a request specification obtained from the IoT customer device 126. The request specification may be a JSON format document having the following basic information needed for access control:
    Which devices the customer wants to access, identified by their DIDs,
    For what time interval and period access is requested,
    Whether control access (write), data access (read), or both are desired.

The format of the protocol exchanged between the IoT access customer agent 104 and the devices 110, as well as the schema of any data provided after access can be established when the device access is enabled or may be predefined and available from the source of the information used by the customer to establish the request specification (i.e. IoT device owner web site, IoT Exchange web site, etc.).

The negotiation between the IoT access customer agent and the IoT device owner agent proceeds as follows. The IoT access customer agent 104 sends an access request to the IoT device owner agent 102 requesting access to a collection of IoT devices 110, signing the access request with the same private key used to create its DID (202). For example, a university transportation research institute agent may send an access request to a city government agent for access to video feeds from traffic light cameras maintained by the city in order to conduct a study on traffic flow. The IoT access customer agent 104 may supply the following information in the access request:
    a. The customer DID 124 it has registered.
    b. A list of device DIDs 122 that it wants to access.
    c. A start date and time for when the data access should begin.
    d. An end date and time for when the data access should end.
    e. The periodicity of how often the data should be sent. For example, in the previous traffic light camera example, the university research institute may only need data every 10 minutes during rush hour.
    f. What permissions are requested. The permissions can be "data", in which case the IoT access customer agent 104 is requesting the IoT devices to send their data, "control" in which case the IoT access customer agent is requesting control, or both "data" and "control" for both.

The IoT device owner agent 102 may perform checks on the access request to ensure it is valid (204):
    a. The IoT device owner agent first checks whether the IoT access customer agent's DID is authentic by looking up the IoT access customer agent's DID document via resolver 118 and verifies the public key signature on the request in operation 202. In addition, the DID document is checked for a service endpoint in the "service" section. If the request is for "data" access, then a service endpoint of type "IoTAccessDataService" may be included. If the request is for "control" access, then a service endpoint of type "IoTAccessControlService" may be included. If both are desired, then both types of service endpoints may be included.

b. Whether the DIDs for the IoT devices 110 in the request belong to the IoT device owner agent 102.

c. Whether the IoT access customer agent 104's customer DID 124 is on DID list 112. This would, for example, be the case for the police department in the example above. If the IoT access customer agent 104 is not allowed such access, the verifiable credential 120 can be returned with the "privacyPreserving" property set to true.

d. Whether the devices' currently scheduled customer manifest and time plan will allow them to accept a new request.

The IoT device owner agent 102 requests a URL from the IoT exchange hub 106 identifying the verifiable credential 120 (206). The IoT exchange hub 106 returns the requested URL (208), for example, https://iot-exchange.example.com/credentials/1872, where in some aspects, the component "1872" of the URL may be an identifier for a verifiable credential 120. In some aspects, the IoT exchange hub 106 may allocate a verifiable credential, associate the verifiable credential with an identifier, and provide the URL with the identifier to the IoT device owner agent 102. In some aspects, identifiers for verifiable credentials may be generated in a sequence, for example, in a sequence corresponding to the order of requests.

The IoT device owner agent 102 formats the verifiable credential 120 (210) using the information provided. In some aspects, the IoT device owner agent 102 can format the verifiable credential 120 by construction a JSON document having a format as described in FIG. 6.

The IoT device owner agent 102 requests a signature or a multikey signature for verifiable credential 120 from authorizing party agents 108 for other parties who have some control over the devices 110 (212). Continuing with the example provided above with respect to operation 202 e.g., the other parties could be a public works department and a police department of city, where the public works department and the police department may need to authorize a request to access IoT devices 110 owned by a city.

The authorizing party agents 108 can consult their policy list 116 and return an appropriate status (214). For example, an "access denied" message may be returned if the DID 124 of the IoT access customer agent 104 is on a list of prohibited entities. If the access is granted, the authorizing party agent 108 signs the verifiable credential 120 with their private key.

The IoT device owner agent 102 returns the verifiable credential 120 to the IoT access customer agent 104 (216). At this point, the IoT access customer agent 104 has been granted access to the requested IoT devices 110 but has not established any data streams or control streams with the IoT devices 110.

Figure 2B:
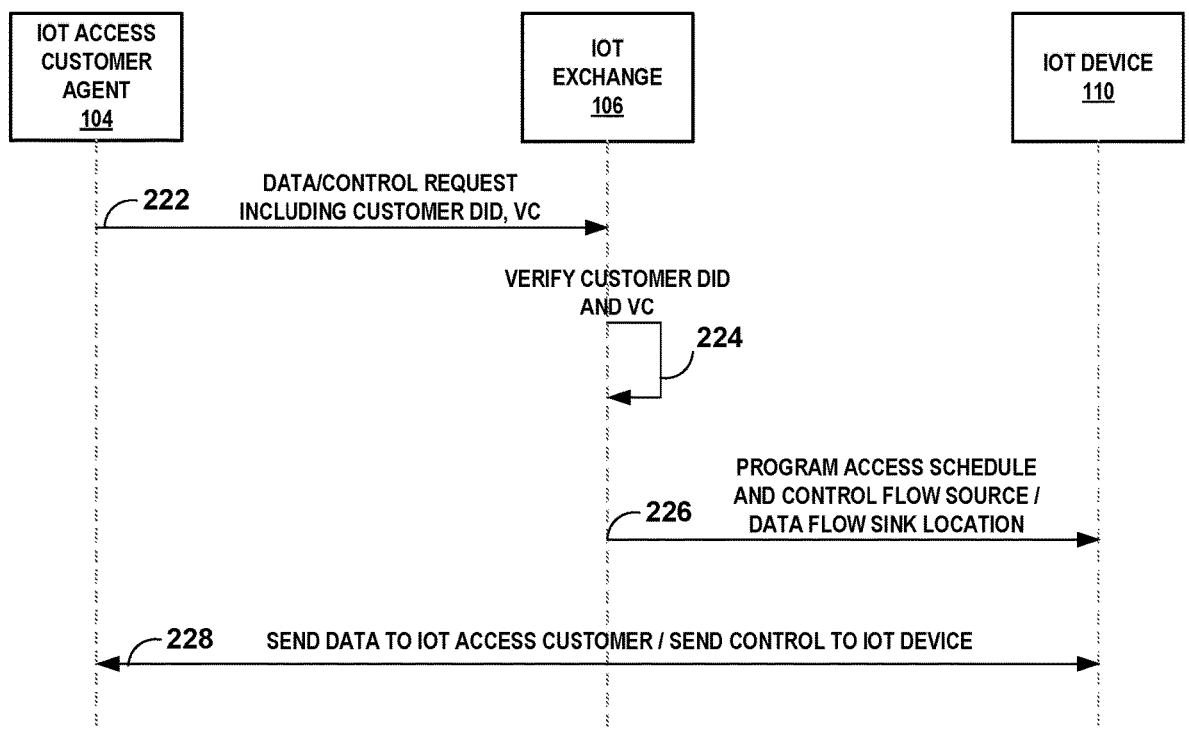
Figure 2C:
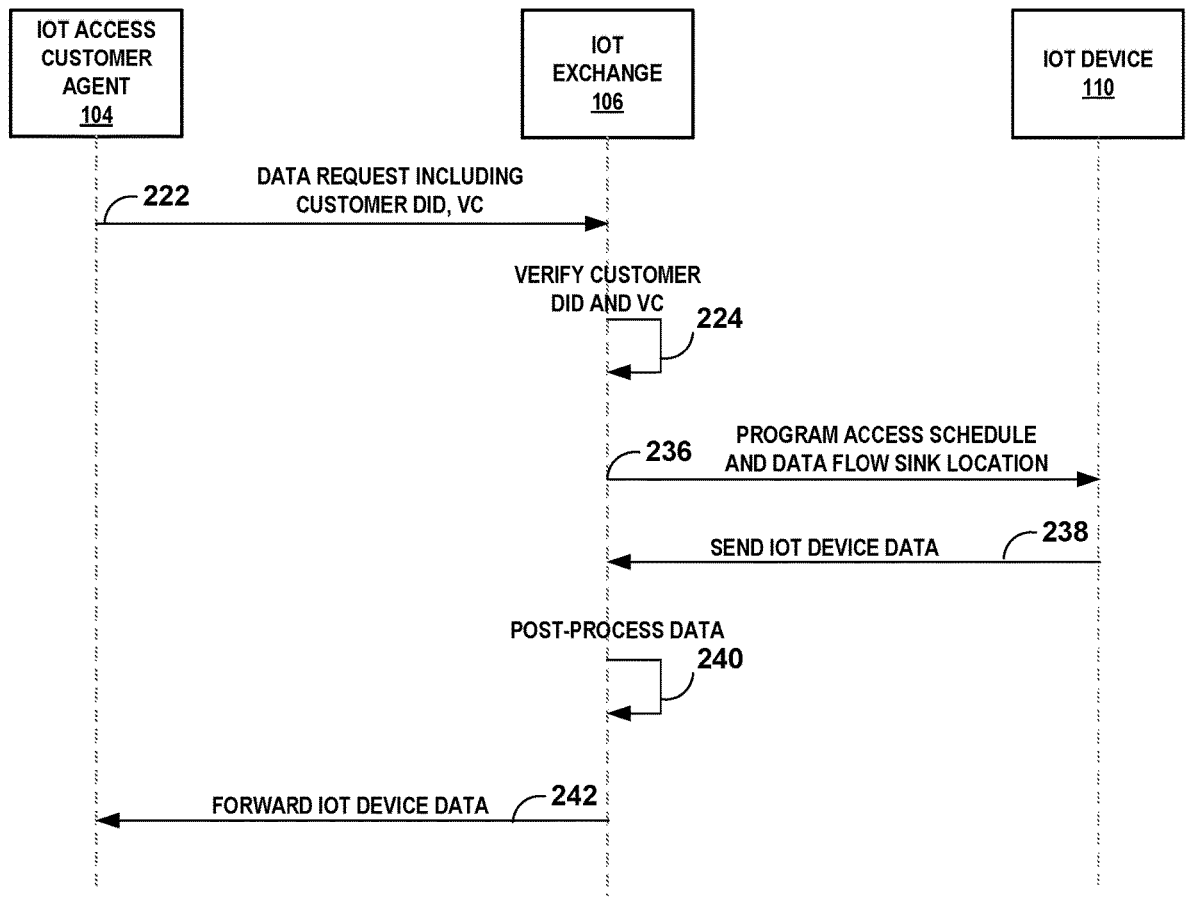
Figure 2D:
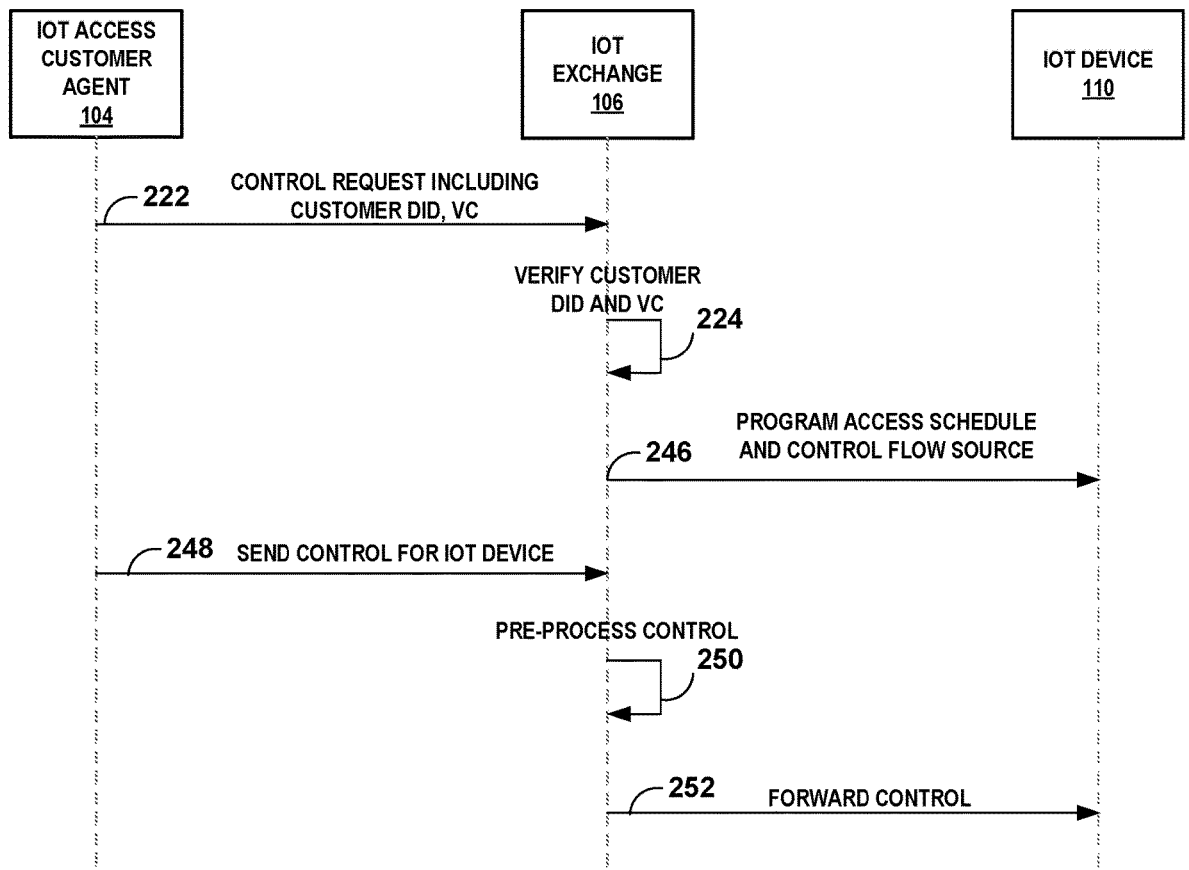

FIGS. 2B-2D are sequence diagrams illustrating example operations for using a verifiable credential 120 to obtain data in a data stream from IoT devices 110 or provide controls in a control stream to IoT devices 110. After the IoT access customer agent 104 has a verifiable credential 120, the IoT access customer agent 104 can use the verifiable credential 120 to obtain access to the IoT devices 110. For communication with the IoT access customer agent 104 to occur, the DID Document 128 for the IoT access customer agent 104 includes a URL for the type of access control it requires, as described above at operations 206 and 208 (FIG. 2A), and similarly, the DID Documents for the IoT devices 110 may include similar service endpoints.

FIGS. 2B-2D are sequence diagrams illustrating example operations for using a verifiable credential 120 to obtain access to IoT devices 110' data. Once the IoT access customer agent 104 has a verifiable credential 120, the IoT access customer agent 104 uses the verifiable credential 120 to obtain access to the IoT devices 110. Note that for communication with the IoT access customer agent 104 to occur, the DID Document for the IoT access customer agent 104 may include a URL for the type of access control it desires, as described above at operations 206 and 208 (FIG. 2A), and similarly, the DID Documents for the IoT devices 110 may include similar service endpoints.

FIG. 2B is a sequence diagram illustrating example operations for using a verifiable credential 120 to obtain access to an IoT device's 110 data when no privacy restrictions have been specified for the IoT access customer agent 104 with respect to an IoT device 110. The IoT access customer agent 104 sends the verifiable credential 120 to the IoT exchange hub 106 requesting access, signing the request with the same private key used to establish the DID (222). In some aspects, the request may be a data request indicating that IoT access customer agent 104 is requesting that IoT device 110 provide data to IoT access customer agent 104. In some aspects, the request may be a control request indicating that IoT access customer agent 104 is requesting to control IoT device 110. In some aspects, the request can be both an access request and a control request.

The IoT exchange hub 106 verifies the request and verifiable credential (224). For example, the IoT exchange hub may authenticate the DID associated with the requesting IoT access customer agent and verify any signatures included with the request.

The IoT exchange hub 106 provides an access schedule and may identify a control stream source or data flow sink to the IoT device 110 (226). The IoT exchange hub 106 modifies the device access control policy for each device on the list to allow access control, exposing device data or allowing device control. For example, the IoT exchange hub 106 may publish data to a provided MQ Telemetry Transport (MQTT) topic or establish sessions to the data consumers according to the instructions in the verifiable credential 120. The IoT access customer agent 104 is granted access to the URL(s) in the IoT access customer agent's DID document, similarly, the device URLs in the device URL documents.

Data flow can occur directly between the IoT devices and the IoT access customer agent 104 (228). In other words, data flow in the form of a data stream or control stream can take place between the IoT devices 110 and the IoT access customer agent 104 without passing through the IoT exchange hub 106, thereby bypassing the IoT exchange hub 106. In some aspects, IoT device 110 responds to IoT access customer agent 104 based on the schedule. As an example, IoT device 110 may receive an access schedule that indicates that data is to be provided to IoT access customer agent 104 at times defined in the access schedule or periodically according to a period set according to the access schedule.

FIG. 2C is a sequence diagram illustrating example operations for using a verifiable credential 120 to obtain access to an IoT device's 110 data when privacy restrictions have been specified for the IoT device 110. In the example sequence of operations illustrated in FIG. 2C, the IoT access customer agent 104's verifiable credential 120 indicates privacy preserving postprocessing is desired. The IoT exchange hub arranges for privacy preserving processing according to its pre/postprocessing specification 114. The privacy preserving preprocessing or postprocessing may specify a series of filters to be deployed. The IoT exchange hub 106 can connect the specified preprocessors 130 and postprocessors 132 together, potentially through an intermediate database.

Operations 222 and 224 are as described above with respect to FIG. 2B.

The IoT exchange hub 106 provides an access schedule and may identify a data flow sink to the IoT device 110 (236). For example, the data flow sink may be a postprocessing filter identified in a pre/postprocessing specification 114. In some aspects, the data flow sink may comprise a URL identifying the postprocessor 132.

The IoT device 110 sends device data to the IoT exchange hub 106 (238). In some aspects, the device data may be sent as defined in the access schedule provided to the IoT device 110 at operation 236. In some aspects, the device data may be sent in response to a request issued by the IoT access customer agent 104. IoT device 110 may respond to the request according to the access schedule.

The IoT exchange hub 106 postprocesses the data to remove potentially private information that might result in an exposure of the private information if sent in unprocessed form to the IoT access customer agent 104 (240).

The IoT exchange hub 106 forwards the postprocessed data to IoT access customer agent 104.

FIG. 2D is a sequence diagram illustrating example operations for using a verifiable credential 120 to obtain access to an IoT device's 110 data when privacy restrictions have been specified for the IoT device 110. In the example sequence of operations illustrated in FIG. 2D, the IoT access customer agent's verifiable credential 120 indicates privacy preserving preprocessing is desired. The IoT exchange hub 106 arranges for privacy preserving preprocessing according to pre/postprocessing specification 114. The privacy preserving preprocessing may include deploying a series of filters and connecting them together, potentially through an intermediate database.

Operations 222 and 224 are as described above with respect to FIG. 2B.

The IoT exchange hub 106 provides an access schedule and may identify a control stream source to the IoT device 110 (246). For example, the control stream source may be a preprocessing filter identified in a pre/postprocessing specification 114.

An IoT access customer agent 104 sends a control stream to the IoT device 110 (248). IoT exchange hub 106 preprocesses the control stream to enforce privacy restrictions (250) using the preprocessing filter(s) specified in the pre/postprocessing specification 114. IoT exchange hub 106 forwards the preprocessed control stream to IoT device 110 (252).

In some aspects, some applications may customize the "credentialSubject" property of a verifiable credential 120 to define what the credential is about (i.e. the "subject" of the credential). For IoT access control, the "credential Subject" may be formatted according to the example JSON schema portion 600 illustrated in FIG. 6.

The operations illustrated in the sequence diagrams of FIGS. 2A-2D may be performed in a different order than shown in the figures or may be performed in parallel.

Figure 3:
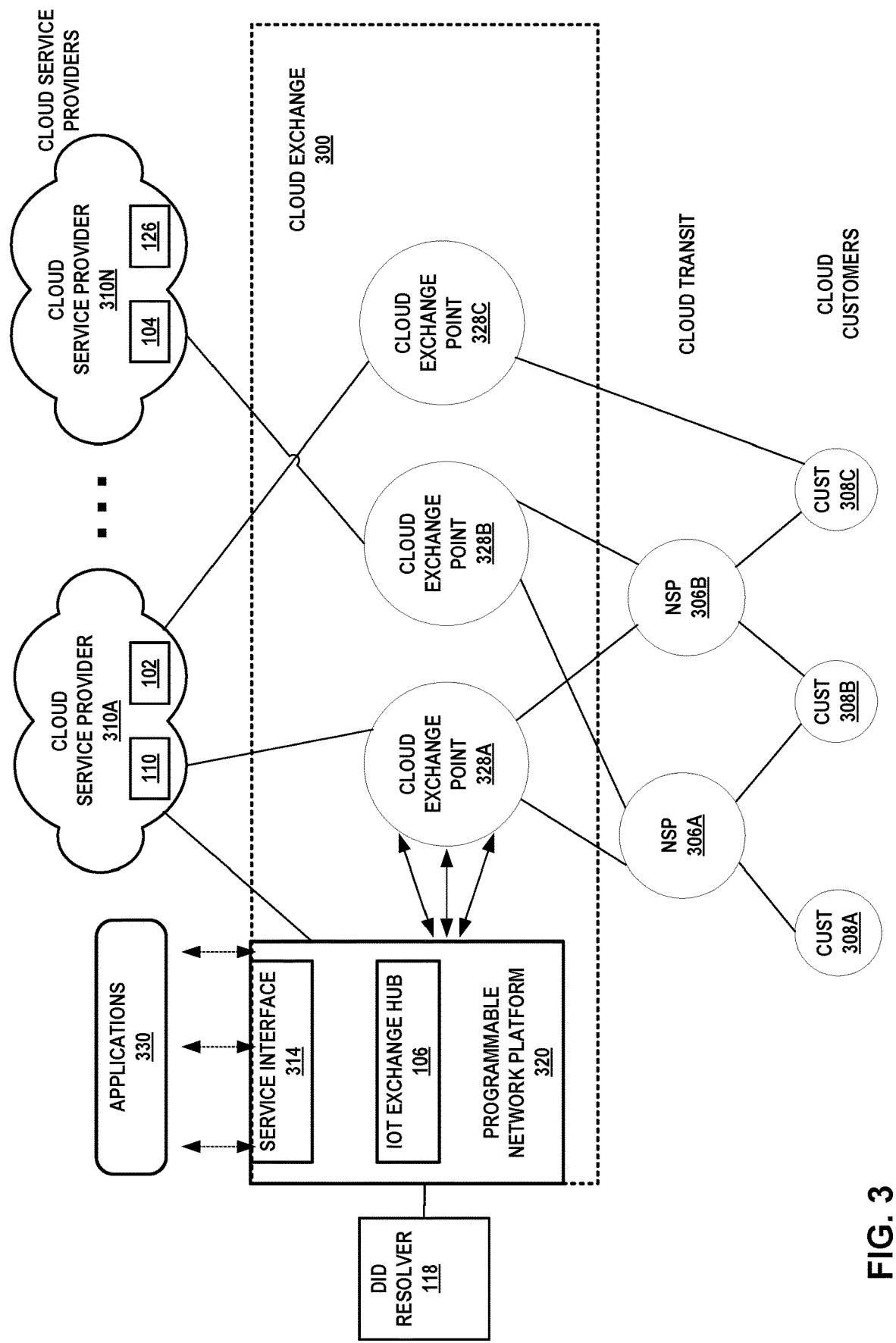
FIG. 3 is a block diagram that illustrates a conceptual view of a network system having a metro-based cloud exchange that provides multiple cloud exchange points according to techniques described herein.
Figure 4:
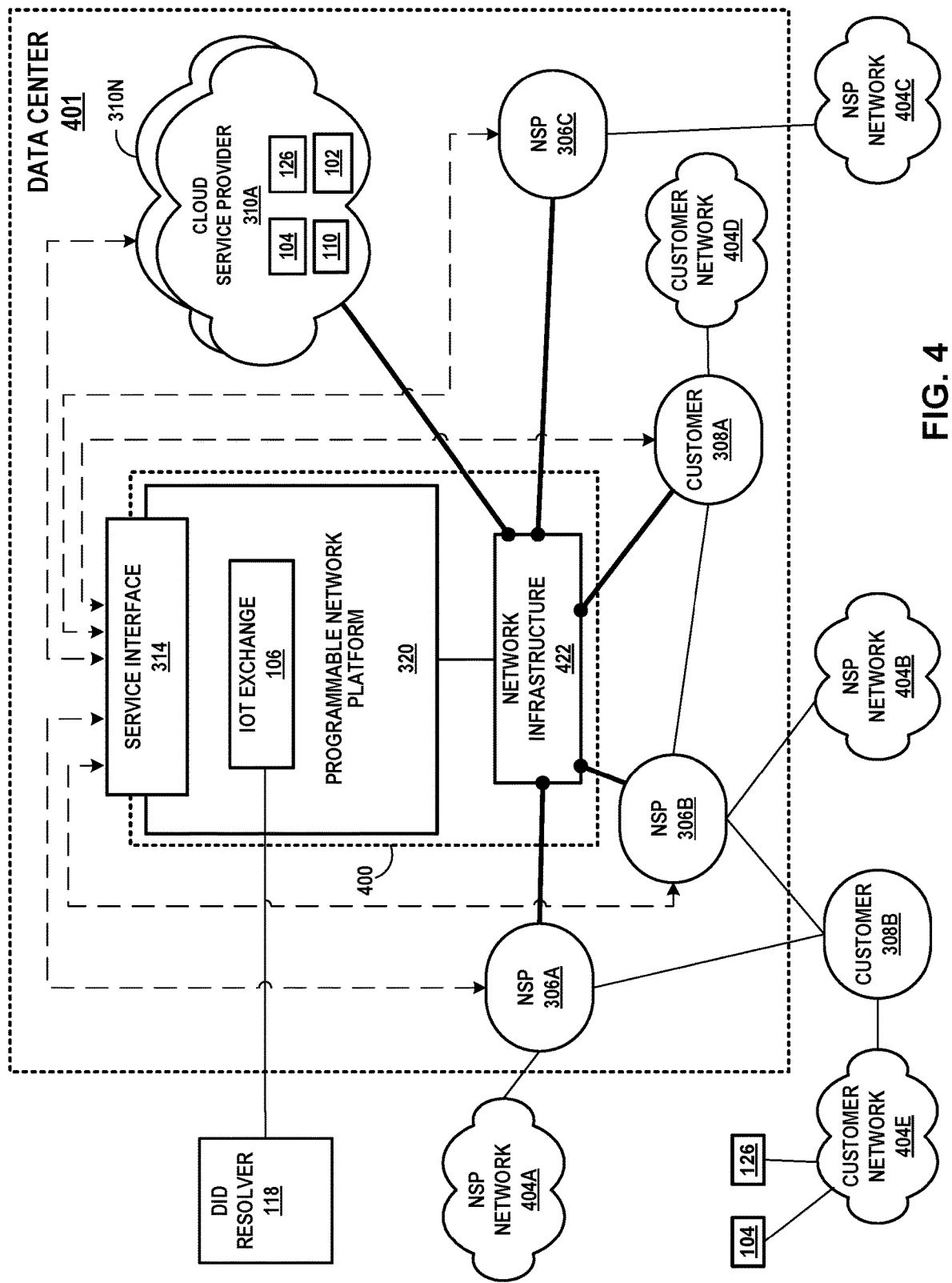
FIG. 4 is a block diagram illustrating a high-level view of a data center that provides an operating environment for a cloud-based services exchange, according to techniques described herein.

FIGS. 3 and 4 show various network systems and components that may be used to implement an IoT access control system 100 as illustrated above in FIG. 1.

FIG. 3 illustrates a conceptual view of a network system having a metro-based cloud exchange that provides multiple cloud exchange points according to techniques described herein. The multiple cloud exchange points may be used to implement, at least in part, an IoT access control system 100. Each of cloud-based services exchange points 328A-328C (described hereinafter as "cloud exchange points" and collectively referred to as "cloud exchange points 328") of cloud-based services exchange 300 ("cloud exchange 300") may represent a different data center geographically located within the same metropolitan area ("metro-based," e.g., in New York City, N.Y.; Silicon Valley, California; Seattle-Tacoma, Washington; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 300 may include more or fewer cloud exchange points 328. In some instances, a cloud exchange 300 includes just one cloud exchange point 328. As used herein, reference to a "cloud exchange" or "cloud-based services exchange" may refer to a cloud exchange point. A cloud exchange provider may deploy instances of cloud exchanges 300 in multiple different metropolitan areas, each instance of cloud exchange 300 having one or more cloud exchange points 328.

Each of cloud exchange points 328 includes network infrastructure and an operating environment by which cloud customers 308A-308C (collectively, "cloud customers 308") receive cloud services from multiple cloud service providers 310A-310N (collectively, "cloud service providers 310"). The cloud service providers 310 may host one of more of IoT device owner agent 102 and IoT access customer agent 104. As noted above, the cloud service providers 310 may be public or private cloud service providers.

Cloud exchange 300 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer may connect to the one or more cloud services offered by the CSPs, respectively. Cloud exchange 300 allows private networks of any customer to be directly cross-connected to any other customer at a common point, thereby allowing direct exchange of network traffic between the networks of the customers.

Cloud customers 308 may receive cloud-based services directly via a layer 3 peering and physical connection to one of cloud exchange points 328 or indirectly via one of network service providers 306A-306B (collectively, "NSPs 306," or alternatively, "carriers 306"). Cloud customers 308 may include customers of the IoT access control system 100 described above. For example, cloud customers 308 may include systems used by any or all of IoT device owner agents 102A-102N, IoT access customer agents 104A-104M, and IoT devices 110 to access the IoT access control system 100. NSPs 306 provide "cloud transit" by maintaining a physical presence within one or more of cloud exchange points 328 and aggregating layer 3 access from one or customers 308. NSPs 306 may peer, at layer 3, directly with one or more cloud exchange points 328 and in so doing offer indirect layer 3 connectivity and peering to one or more customers 308 by which customers 308 may obtain cloud services from the cloud exchange 300. Each of cloud exchange points 328, in the example of FIG. 3, is assigned a different autonomous system number (ASN). For example, cloud exchange point 328A is assigned ASN 1, cloud exchange point 328B is assigned ASN 2, and so forth. Each cloud exchange point 328 is thus a next hop in a path vector routing protocol (e.g., BGP) path from cloud service providers 310 to customers 308. As a result, each cloud exchange point 328 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 310 to customers. In other words, cloud exchange points 328 may internalize the eBGP peering relationships that cloud service providers 310 and customers 308 would maintain on a pair-wise basis. Instead, a customer 308 may configure a single eBGP peering relationship with a cloud exchange point 328 and receive, via the cloud exchange, multiple cloud services from one or more cloud service providers 310. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 308C is illustrated as having contracted with a cloud exchange provider for cloud exchange 300 to directly access layer 3 cloud services via cloud exchange points 328C. In this way, customer 308C receives redundant layer 3 connectivity to cloud service provider 310A, for instance. Customer 308C, in contrast, is illustrated as having contracted with the cloud exchange provider for cloud exchange 300 to directly access layer 3 cloud services via cloud exchange point 328C and also to have contracted with NSP 306B to access layer 3 cloud services via a transit network of the NSP 306B. Customer 308B is illustrated as having contracted with multiple NSPs 306A, 306B to have redundant cloud access to cloud exchange points 328A, 328B via respective transit networks of the NSPs 306A, 306B. The contracts described above are instantiated in network infrastructure of the cloud exchange points 328 by L3 peering configurations within switching devices of NSPs 306 and cloud exchange points 328 and L3 connections, e.g., layer 3 virtual circuits, established within cloud exchange points 328 to interconnect cloud service provider 310 networks to NSPs 306 networks and customer 308 networks, all having at least one port offering connectivity within one or more of the cloud exchange points 328.

In some examples, cloud exchange 300 allows a corresponding one of customers 308A, 308B of any network service providers (NSPs) or "carriers" 306A-306B (collectively, "carriers 306") or other cloud customers including customers 308C to be directly connected, via a virtual layer 2 (L2) or layer 3 (L3) connection to any other customer network and/or to any of CSPs 310, thereby allowing direct exchange of network traffic among the customer networks and CSPs 310. The virtual L2 or L3 connection may be referred to as a "virtual circuit."

Carriers 306 may each represent a network service provider that is associated with a transit network by which network subscribers of the carrier 306 may access cloud services offered by CSPs 310 via the cloud exchange 300. In general, customers of CSPs 310 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 310 via the cloud exchange 300.

In this way, cloud exchange 300 streamlines and simplifies the process of partnering CSPs 310 and customers (via carriers 306 or directly) in a transparent and neutral manner. One example application of cloud exchange 300 is a co-location and interconnection data center in which CSPs 310 and carriers 306 and/or customers 308 may already have network presence, such as by having one or more accessible ports available for interconnection within the data center, which may represent any of cloud exchange points 328. This allows the participating carriers, customers, and CSPs to have a wide range of interconnectivity options within the same facility. A carrier/customer may in this way have options to create many-to-many interconnections with only a one-time hook up to one or more cloud exchange points 328. In other words, instead of having to establish separate connections across transit networks to access different cloud service providers or different cloud services of one or more cloud service providers, cloud exchange 300 allows customers to interconnect to multiple CSPs and cloud services.

Cloud exchange 300 includes a programmable network platform 320 for dynamically programming cloud exchange 300 to responsively and assuredly fulfill service requests that encapsulate business requirements for services provided by cloud exchange 300 and/or cloud service providers 310 coupled to the cloud exchange 300. The programmable network platform 320 may, as a result, orchestrate a business-level service across heterogeneous cloud service providers 310 according to well-defined service policies, quality of service policies, service level agreements, and costs, and further according to a service topology for the business-level service. As an example, programmable network platform 320 may implement some or all of the functionality described herein provided by an IoT access control system 100. (FIG. 1).

The programmable network platform 320 enables the cloud service provider that administers the cloud exchange 300 to dynamically configure and manage the cloud exchange 300 to, for instance, facilitate virtual connections for cloud-based services delivery from multiple cloud service providers 310 to one or more cloud customers 308. The cloud exchange 300 may enable cloud customers 308 to bypass the public Internet to directly connect to cloud services providers 310 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 320 enables the cloud service provider to configure cloud exchange 300 with a L3 instance requested by a cloud customer 308, as described herein. A customer 308 may request an L3 instance to link multiple cloud service providers by the L3 instance, for example (e.g., for transferring the customer's data between two cloud service providers, or for obtaining a mesh of services from multiple cloud service providers).

Programmable network platform 320 may represent an application executing within one or more data centers of the cloud exchange 300 or alternatively, off-site at a back office or branch of the cloud provider (for instance). Programmable network platform 320 may be distributed in whole or in part among the data centers, each data center associated with a different cloud exchange point 328 to make up the cloud exchange 300. Although shown as administering a single cloud exchange 300, programmable network platform 320 may control service provisioning for multiple different cloud exchanges. Alternatively or additionally, multiple separate instances of the programmable network platform 320 may control service provisioning for respective multiple different cloud exchanges.

In the illustrated example, programmable network platform 320 includes a service interface (or "service API") 314 that defines the methods, fields, and/or other software primitives by which applications 330, such as a customer portal, may invoke the programmable network platform 320. The service interface 314 may allow carriers 306, customers 308, cloud service providers 310, and/or the cloud exchange provider programmable access to capabilities and assets of the cloud exchange 300 according to techniques described herein.

For example, the service interface 314 may facilitate machine-to-machine communication to enable dynamic provisioning of virtual circuits in the cloud exchange for interconnecting customer and/or cloud service provider networks. In this way, the programmable network platform 320 enables the automation of aspects of cloud services provisioning. For example, the service interface 314 may provide an automated and seamless way for customers to establish, de-install and manage interconnections among multiple, different cloud providers participating in the cloud exchange.

Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

FIG. 4 is a block diagram illustrating a high-level view of a data center 401 that provides an operating environment for a cloud-based services exchange 400, according to techniques described herein. Cloud-based services exchange 400 ("cloud exchange 400") allows a corresponding one of customer networks 404D, 404E and NSP networks 404A-404C (collectively, "'private' or 'carrier' networks 404") of any NSPs 306A-306C or other cloud customers including customers 308A, 308B to be directly connected, via a layer 3 (L3) or layer 2 (L2) connection to any other customer network and/or to any of cloud service providers 310A-310N, thereby allowing exchange of cloud service traffic among the customer networks and/or CSPs 310. Data center 401 may be entirely located within a centralized area, such as a warehouse or localized data center complex, and provide power, cabling, security, and other services to NSPs, customers, and cloud service providers that locate their respective networks within the data center 401 (e.g., for co-location) and/or connect to the data center 401 by one or more external links.

Network service providers 306 may each represent a network service provider that is associated with a transit network by which network subscribers of the NSP 306 may access cloud services offered by CSPs 310 via the cloud exchange 400. In general, customers of CSPs 310 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 310 via the cloud exchange 400.

In this way, cloud exchange 400 streamlines and simplifies the process of partnering CSPs 310 and customers 308 (indirectly via NSPs 306 or directly) in a transparent and neutral manner. One example application of cloud exchange 400 is a co-location and interconnection data center in which CSPs 310, NSPs 306 and/or customers 308 may already have network presence, such as by having one or more accessible ports available for interconnection within the data center. This allows the participating carriers, customers, and CSPs to have a wide range of interconnectivity options in the same facility.

Cloud exchange 400 of data center 401 includes network infrastructure 422 that provides a L2/L3 switching fabric by which CSPs 310 and customers/NSPs interconnect. This enables an NSP/customer to have options to create many-to-many interconnections with only a one-time hook up to the switching network and underlying network infrastructure 422 that presents an interconnection platform for cloud exchange 400. In other words, instead of having to establish separate connections across transit networks to access different cloud service providers or different cloud services of one or more cloud service providers, cloud exchange 400 allows customers to interconnect to multiple CSPs and cloud services using network infrastructure 422 within data center 401, which may represent any of the edge networks described in this disclosure, at least in part.

By using cloud exchange 400, customers can purchase services and reach out to many end users in many different geographical areas without incurring the same expenses typically associated with installing and maintaining multiple virtual connections with multiple CSPs 310. For example, NSP 306A may expand its services using network 404B of NSP 306B. By connecting to cloud exchange 400, an NSP 306 may be able to generate additional revenue by offering to sell its network services to the other carriers. For example, NSP 306C may offer the opportunity to use NSP network 404C to the other NSPs.

Cloud exchange 400 includes an programmable network platform 320 that exposes at least one service interface, which may include in some examples and are alternatively referred to herein as application programming interfaces (APIs) in that the APIs define the methods, fields, and/or other software primitives by which applications may invoke the programmable network platform 320. As an example, the functionality provided by IoT exchange hub 120 may be implemented on programmable network platform 320. The software interfaces allow NSPs 306 and customers 308 programmable access to capabilities and assets of the cloud exchange 400. The programmable network platform 320 may alternatively be referred to as a controller, provisioning platform, provisioning system, service orchestration system, etc., for establishing end-to-end services including, e.g., connectivity between customers and cloud service providers according to techniques described herein.

On the buyer side, the software interfaces presented by the underlying interconnect platform provide an extensible framework that allows software developers associated with the customers of cloud exchange 400 (e.g., customers 308 and NSPs 306) to create software applications (e.g., IoT access customer agents 104A-104N (FIG. 1)) that allow and leverage access to the programmable network platform 320 by which the applications may request that the cloud exchange 400 establish connectivity between the customer and cloud services offered by any of the CSPs 310. For example, these buyer-side software interfaces may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services, including dynamic selection of bandwidth based on a purchased cloud service to create on-demand and need based virtual circuits to or between cloud service providers, delete virtual circuits, obtain active virtual circuit information, obtain details surrounding CSPs partnered with the cloud exchange provider, obtain customized analytics data, validate partner access to interconnection assets, and assure service delivery.

On the cloud service provider seller side, the software interfaces may allow software developers associated with cloud providers to manage their cloud services and to enable customers to connect to their cloud services. For example, these seller-side software interfaces may allow cloud service provider applications to obtain authorization to access the cloud exchange, obtain information regarding available cloud services, obtain active ports and metro area details for the provider, obtain active port details in a given data center for the provider, approve or reject virtual circuits of varying bandwidth created by customers for the purpose of accessing cloud services, obtain virtual circuits pending addition and confirm addition of virtual circuits, obtain virtual circuits pending deletion and confirm deletion of virtual circuits, obtain customized analytics data, validate partner access to interconnection assets, and assure service delivery.

Service interface 314 facilitates machine-to-machine communication to enable dynamic service provisioning and service delivery assurance. In this way, the programmable network platform 320 enables the automation of aspects of cloud services provisioning. For example, the software interfaces may provide an automated and seamless way for customers to establish, de-install and manage interconnection with or between multiple, different cloud providers participating in the cloud exchange. The programmable network platform 320 may in various examples execute on one or virtual machines and/or real servers of data center 401, or off-site.

In the example of FIG. 4, network infrastructure 422 represents the cloud exchange switching fabric and includes multiple ports that may be dynamically interconnected with virtual circuits by, e.g., invoking service interface 314 of the programmable network platform 320. Each of the ports is associated with one of carriers 306, customers 308, and CSPs 310.

In some examples, a cloud exchange seller (e.g., an enterprise or a CSP nested in a CSP) may request and obtain an L3 instance, and may then create a seller profile associated with the L3 instance, and subsequently operate as a seller on the cloud exchange. The techniques of this disclosure enable multiple CSPs to participate in an Enterprise's L3 instance (e.g., an L3 "routed instance" or L2 "bridged instance") without each CSP flow being anchored with an enterprise device.

In some aspects, the programmable network platform may provision a cloud exchange to deliver services made up of multiple constituent services provided by multiple different cloud service providers, where this is provided via the L3 instance as a service described herein. Each of these constituent services is referred to herein as a "micro-service" in that it is part of an overall service applied to service traffic. That is, a plurality of micro-services may be applied to service traffic in a particular "arrangement," "ordering," or "topology," in order to make up an overall service for the service traffic. The micro-services themselves may be applied or offered by the cloud service providers 310.

Figure 5A:
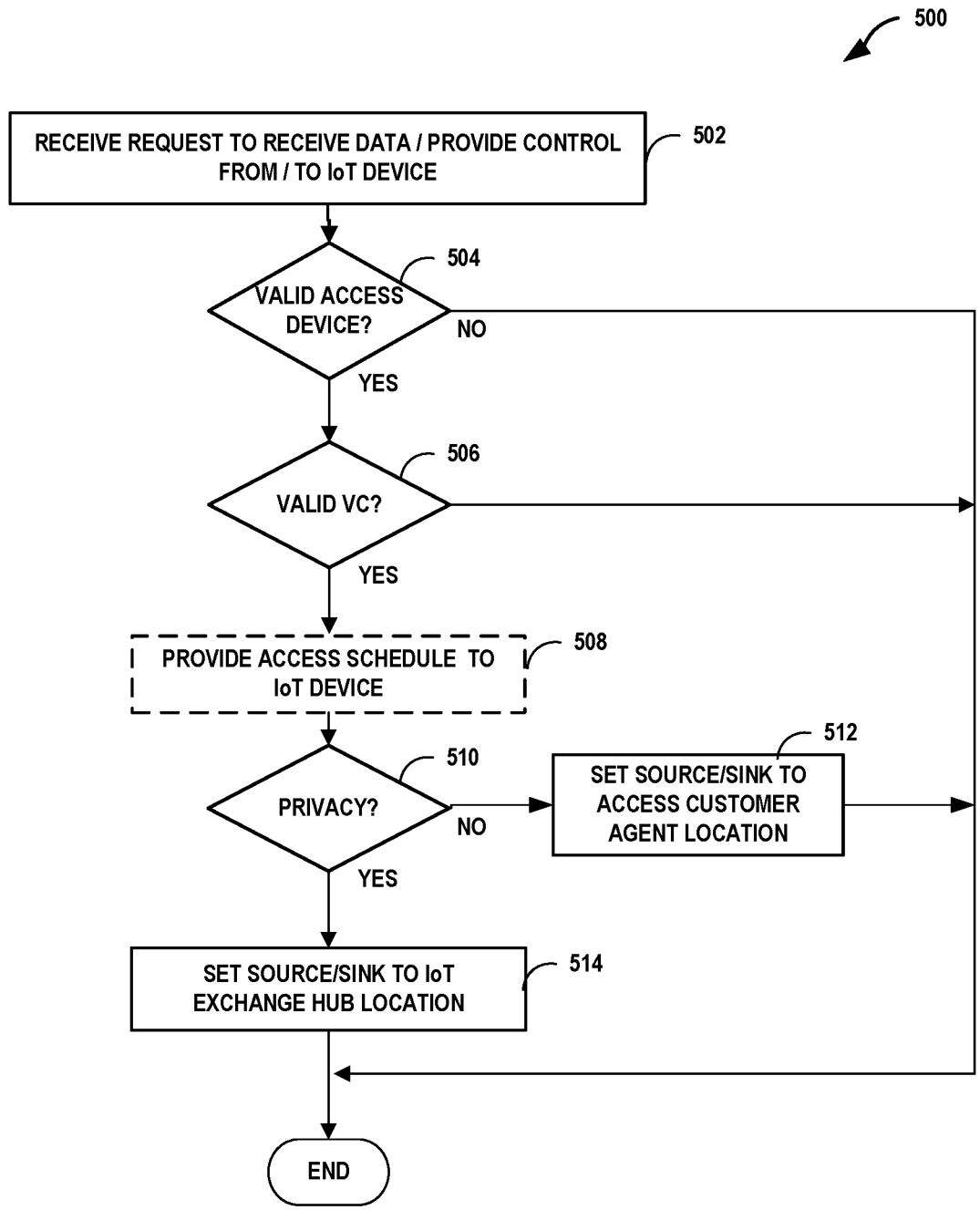
FIG. 5A is a flowchart illustrating example operations for processing an access request by an IoT exchange hub according to techniques described herein.

FIG. 5A is a flowchart 500 illustrating example operations for processing an access request by an IoT exchange hub 106 according to techniques described in this disclosure. The IoT exchange hub 106 can receive a request from an IoT access customer agent 104 to obtain a data stream from an IoT device 110, provide a control stream of data to an IoT device 110, or both (502). The request can include a DID of the requesting IoT access customer agent 104 and a verifiable credential previously obtained from an IoT device owner agent associated with the device. Additionally, the request can include an access schedule for receiving data or providing controls.

The IoT exchange hub 106 can validate the DID of the requesting IoT access customer agent 104 (504). For example, the IoT exchange hub can query a DID resolver 118 to determine if the DID is valid. If the DID is not valid, the method ends ("NO" branch of 504). If the DID is valid ("YES" branch of 504), the IoT exchange hub can proceed to validate the verifiable credential 120 provided in the request (506). Various validations can be performed. For example, the IoT exchange hub can determine whether the verifiable credential 120 is valid for the IoT device 110 that is the subject of the request. In other words, the IoT exchange hub 106 can determine if the verifiable credential 120 provided by the IoT access customer agent 104 indicates that the IoT access customer agent 104 has been granted access to the IoT device 110. The IoT exchange hub 106 can determine whether the access schedule provided in the request can be accommodated by the IoT device 110. For example, the start time or end time specified in the verifiable credential may be outside of a time window of allowable access. Alternatively, the IoT device may not be able to accommodate further requests for data or may not be able to provide data at the periodicity specified in the verifiable credential. If the verifiable credential is not valid, the method ends ("NO" branch of 506). If the verifiable credential is valid ("YES" branch of 506), the IoT exchange hub optionally provides an access schedule obtained from the verifiable credential to the IoT device 110 (508). In some aspects, an IoT device 110 may not be able to process a schedule. For example, the IoT device 110 may not have the resources available to process the access schedule. In such cases, the IoT exchange hub 106 can process the schedule and obtain data from the IoT device 110 according to the schedule.

As described above, a verifiable credential can include a privacy indicator. The IoT exchange hub can determine from the privacy indicator whether a data stream or a control stream is to preserve privacy of individuals or other entities that may appear in the data stream (510). As an example, a data stream comprising images obtained from a traffic camera may include faces and license place information. Such information may be considered private information. If the privacy indicator indicates that privacy is not to be preserved ("NO" branch of 510), then the IoT exchange hub can set a control stream source location (source of a control stream) or a data sink location (destination of a data stream) to be the IoT access customer agent location, for example, a TCP/IP address for the IoT access customer agent (512). In this case (i.e., when privacy is not preserved), the IoT device 110 and the IoT access customer agent 104 can communicate directly with one another, and the IoT exchange hub need not be further involved. The method then ends.

If the privacy indicator indicates that privacy is to be preserved ("YES" branch of 510), the IoT exchange hub can set the control stream source location or the data sink location to be the IoT exchange hub, for example, a TCP/IP address of the IoT exchange hub (514).

Figure 5B:
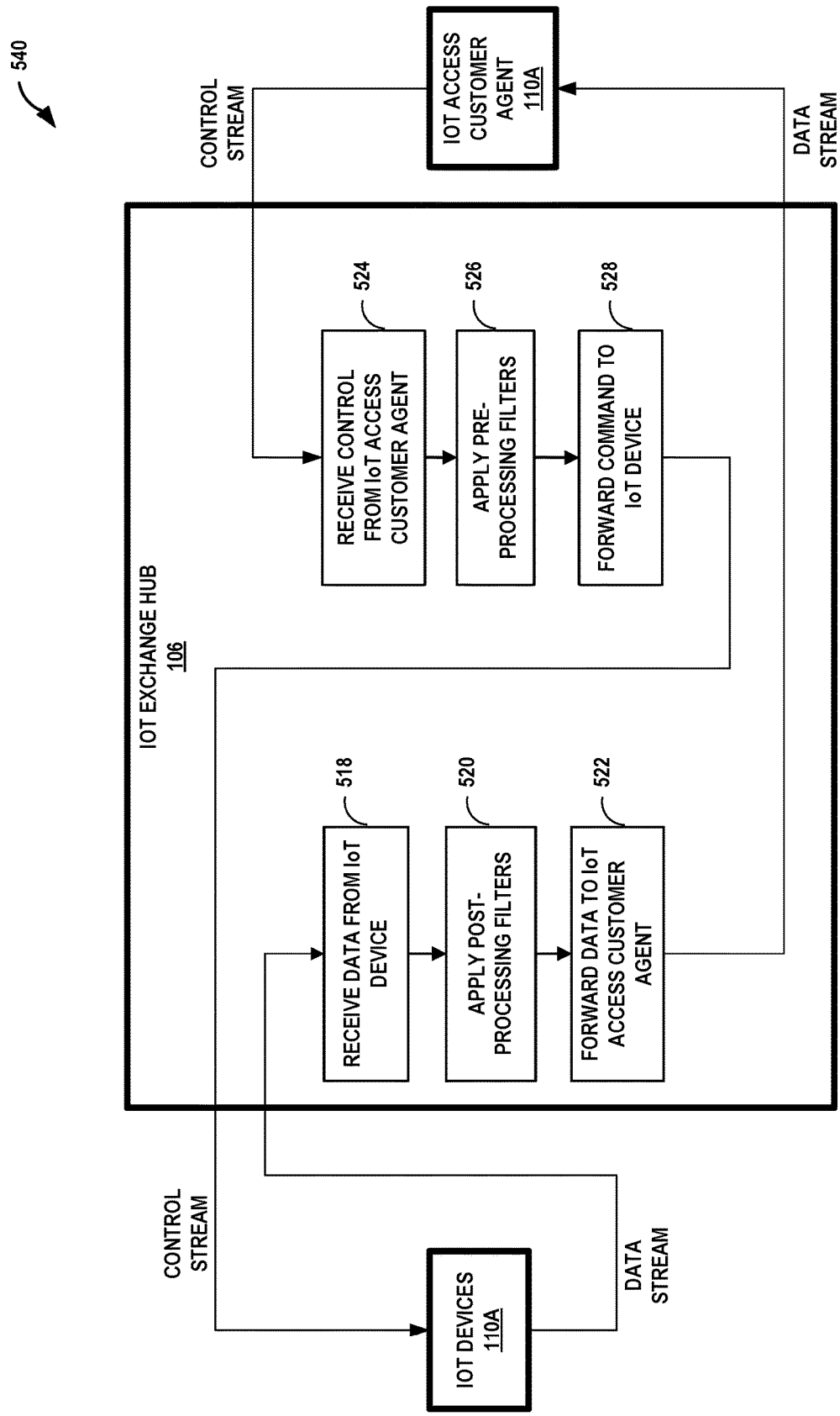
FIG. 5B is a flowchart illustrating example operations for processing data streams and control streams by an IoT exchange hub according to techniques described herein.

FIG. 5B is a flowchart 540 illustrating example operations for processing data streams and control streams by an IoT exchange hub 106 according to techniques described in this disclosure.

Processing for data streams (i.e., data sent from the IoT device 110 to the IoT access customer agent 104) may be as follows. The IoT exchange hub receives data from the IoT device 110 (518). The IoT exchange hub can apply one or more postprocessing filters specified in the verifiable credential to the data to remove private information from the data (520). Examples of such postprocessing filters include filters to obscure faces, license plates, address information etc. from image data. Further filters may exist to remove or obfuscate location information, tax identification information, health information etc. from a data stream. The postprocessed data stream as filtered by the IoT exchange hub can then be forwarded to the IoT access customer agent (522).

Processing for control streams (i.e., controls sent from an IoT access customer agent 104 to the IoT device 110) may be is as follows. The IoT exchange hub receives one or more controls from the IoT access customer agent 104 (524). The IoT exchange hub can apply one or more preprocessing filters specified in the verifiable credential to the data to remove private information from the controls or alter the controls to avoid disclosing private information (526). For example, a preprocessing filter may remove or alter controls that would cause a camera to pan into an area that has proprietary or private information. The preprocessed control stream as filtered by the IoT exchange hub can then be forwarded to the IoT device 110 for processing (528).

Figure 7:
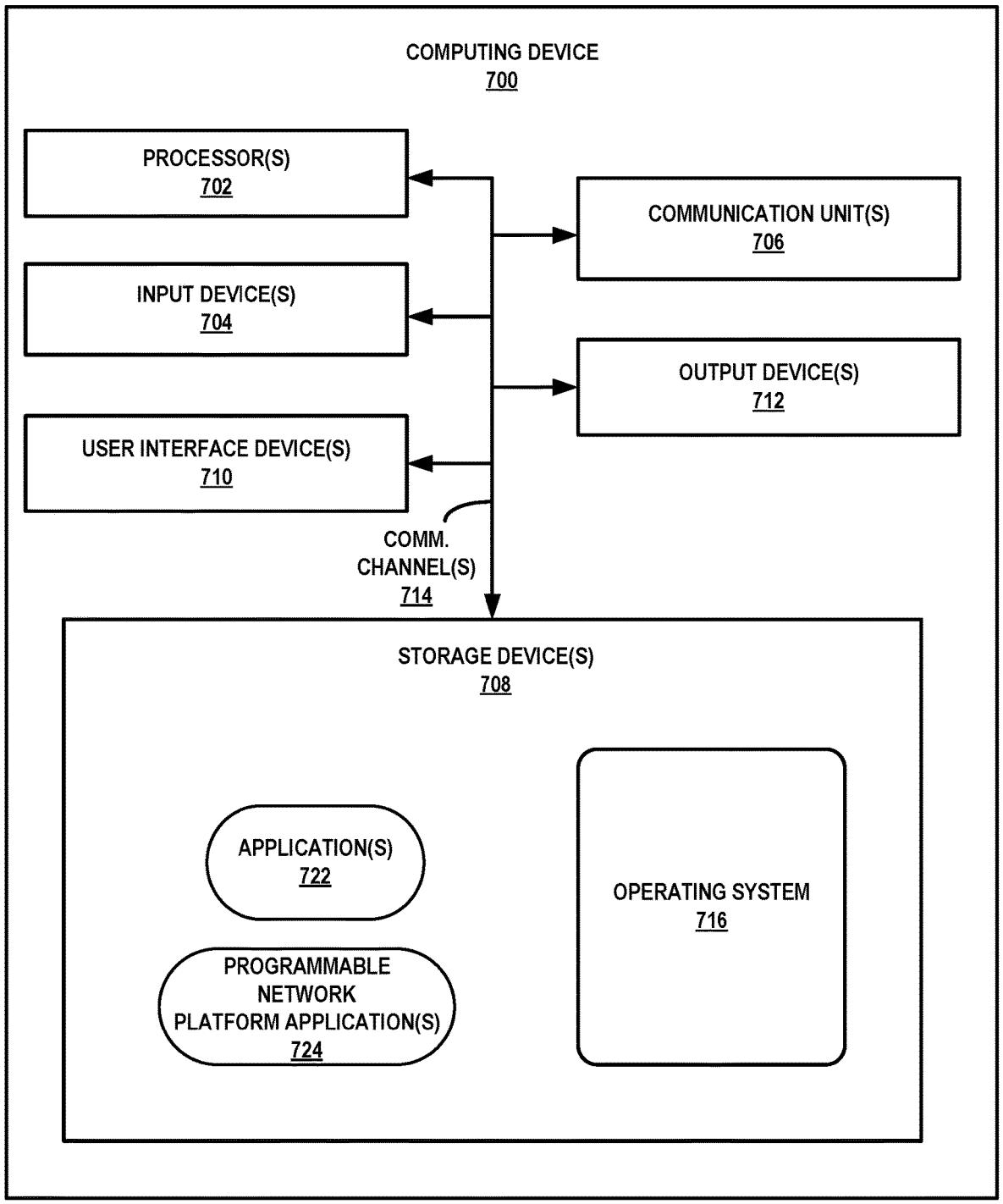
FIG. 7 is a block diagram illustrating further details of one example of a computing device that operates in accordance with one or more techniques of the present disclosure.

FIG. 7 is a block diagram illustrating further details of one example of a computing device that operates in accordance with one or more techniques of the present disclosure. FIG. 7 may illustrate a particular example of a server or other computing device 700 that includes one or more processor (s) 702 for executing any one or more of the programmable network platform components, or any other system, application, or module described herein. Other examples of computing device 700 may be used in other instances. Although shown in FIG. 7 as a stand-alone computing device 700 for purposes of example, a computing device may be any component or system that includes one or more processors or other suitable computing environment for executing software instructions and, for example, need not necessarily include one or more elements shown in FIG. 7 (e.g., communication units 706; and in some examples components such as storage device(s) 708 may not be co-located or in the same chassis as other components).

As shown in the specific example of FIG. 7, computing device 700 includes one or more processors 702, one or more input devices 704, one or more communication units 706, one or more output devices 712, one or more storage devices 708, and user interface (UI) device 710, and communication unit 706. Computing device 700, in one example, further includes one or more applications 722, programmable network platform application(s) 724, and operating system 716 that are executable by computing device 700. Each of components 702, 704, 706, 708, 710, and 712 are coupled (physically, communicatively, and/or operatively) for inter-component communications. In some examples, communication channels 714 may include a system bus, a network connection, an inter-process communication data structure, or any other method for communicating data. As one example, components 702, 704, 706, 708, 710, and 712 may be coupled by one or more communication channels 714.

Processors 702, in one example, are configured to implement functionality and/or process instructions for execution within computing device 700. For example, processors 702 may be capable of processing instructions stored in storage device 708. Examples of processors 702 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 708 may be configured to store information within computing device 700 during operation. Storage device 708, in some examples, is described as a computer-readable storage medium. In some examples, storage device 708 is a temporary memory, meaning that a primary purpose of storage device 708 is not long-term storage. Storage device 708, in some examples, is described as a volatile memory, meaning that storage device 708 does not maintain stored contents when the computer is turned off. Examples of volatile memories include random access memories (RAM), dynamic random access memories (DRAM), static random access memories (SRAM), and other forms of volatile memories known in the art. In some examples, storage device 708 is used to store program instructions for execution by processors 702. Storage device 708, in one example, is used by software or applications running on computing device 700 to temporarily store information during program execution.

Storage devices 708, in some examples, also include one or more computer-readable storage media. Storage devices 708 may be configured to store larger amounts of information than volatile memory. Storage devices 708 may further be configured for long-term storage of information. In some examples, storage devices 708 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 700, in some examples, also includes one or more communication units 706. Computing device 700, in one example, utilizes communication units 706 to communicate with external devices via one or more networks, such as one or more wired/wireless/mobile networks. Communication units 706 may include a network interface card, such as an Ethernet card, an optical transceiver, a radio frequency transceiver, or any other type of device that can send and receive information. In some examples, computing device 700 uses communication unit 706 to communicate with an external device.

Computing device 700, in one example, also includes one or more user interface devices 710. User interface devices 710, in some examples, are configured to receive input from a user through tactile, audio, or video feedback. Examples of user interface devices(s) 710 include a presence-sensitive display, a mouse, a keyboard, a voice responsive system, video camera, microphone or any other type of device for detecting a command from a user. In some examples, a presence-sensitive display includes a touch-sensitive screen.

One or more output devices 712 may also be included in computing device 700. Output device 712, in some examples, is configured to provide output to a user using tactile, audio, or video stimuli. Output device 712, in one example, includes a presence-sensitive display, a sound card, a video graphics adapter card, or any other type of device for converting a signal into an appropriate form understandable to humans or machines. Additional examples of output device 712 include a speaker, a cathode ray tube (CRT) monitor, a liquid crystal display (LCD), or any other type of device that can generate intelligible output to a user.

Computing device 700 may include operating system 716. Operating system 716, in some examples, controls the operation of components of computing device 700. For example, operating system 716, in one example, facilitates the communication of one or more applications 722 and programmable network platform application(s) 724 with processors 702, communication unit 706, storage device 708, input device 704, user interface devices 710, and output device 712.

Application 722 and programmable network platform application(s) 724 may also include program instructions and/or data that are executable by computing device 700. Example programmable network platform application(s) 724 executable by computing device 700 may include application and/or other software to implement capabilities provided by IoT device owner agent 102, IoT access customer agent 104, IoT exchange hub 106, authorizing party agents 108, and DID resolver 118.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
    an Internet of Things (IoT) device owner agent configured to manage access to a plurality of IoT devices;
    an IoT access customer agent configured to provide to the IoT device owner agent an access request to access an IoT device of the plurality of IoT devices, the access request including one or more request properties, the one or more request properties including a privacy preserving parameter,
    wherein in response to the access request, the IoT device owner agent is configured to receive an identifier for a verifiable credential, format the verifiable credential in accordance with the one or more request properties, and provide the verifiable credential to the IoT access customer agent, wherein the verifiable credential includes a decentralized identifier identifying the IoT device; and
    an IoT exchange hub configured to:
        receive a request for an identifier for the verifiable credential from the IoT device owner agent,
        allocate the verifiable credential including the decentralized identifier identifying the IoT device, and
        provide the identifier of the verifiable credential to the IoT device owner agent.

2. The system of claim 1, wherein the IoT exchange hub is further configured to:
    receive a data request from the IoT access customer agent, the data request including the verifiable credential and a decentralized identifier for the IoT access customer agent,
    authenticate the decentralized identifier of the IoT access customer agent,
    verify the verifiable credential, and
    in response to a determination that the verifiable credential and the decentralized identifier for the IoT access customer agent are valid, forward the data request to the IoT device.

3. The system of claim 1, wherein the identifier for the verifiable credential comprises a URL.

4. The system of claim 1, further comprising one or more authorizing party agents, wherein the IoT device owner agent requests a signature for the verifiable credential from at least one of the one or more authorizing party agents and wherein the at least one of the one or more authorizing party agents provides the signature for use with the verifiable credential.

5. The system of claim 1,
    wherein the privacy preserving parameter indicates that a data stream from the IoT device or a control stream to the IoT device is not to be filtered for private information, and
    wherein the IoT device sends data to the IoT access customer agent or receives controls from the IoT access customer agent, bypassing the IoT exchange hub.

6. The system of claim 1,
    wherein the privacy preserving parameter indicates that a data stream from the IoT device is to be filtered for private information, and wherein the IoT exchange hub is configured to postprocess data in the data stream received from the IoT device and forward the postprocessed data to the IoT access customer agent.

7. The system of claim 1, wherein the IoT exchange hub is further configured to:
   receive a control request from the IoT access customer agent, the control request including the verifiable credential and a decentralized identifier for the IoT access customer agent,
   authenticate the decentralized identifier for the IoT access customer agent,
   verify the verifiable credential;
   in response to a determination that the verifiable credential is valid and the decentralized identifier for the IoT access customer agent is authentic, forward the control request to the IoT device.

8. The system of claim 1, wherein the privacy preserving parameter indicates that a control stream for the IoT device is to be filtered for private information, and wherein the IoT exchange hub is configured to preprocess data in the control stream received from the IoT access customer agent and forward the preprocessed data to the IoT device.

9. An Internet of Things (IoT) exchange hub comprising:
   one or more processors; and
   a memory having instructions that, when executed, cause the one or more processors to:
     receive, from an IoT access customer agent, a verifiable credential in a request to access an IoT device, the request comprising a data stream request or a control stream request, wherein the verifiable credential comprises a decentralized identifier identifying the IoT access customer agent and a decentralized identifier identifying the IoT device,
     authenticate the decentralized identifier identifying the IoT access customer agent,
     verify the verifiable credential, and
     in response to a determination that the verifiable credential is valid and the decentralized identifier associated with the IoT access customer agent is valid, provide a control stream source location or a data sink location to the IoT device associated with the decentralized identifier identifying the IoT device.

10. The IoT exchange hub of claim 9, wherein:
    the request to access the IoT device includes an access schedule;
    the instructions cause the one or more processors to provide the access schedule to the IoT device; and
    the IoT device responds to the request to access the IoT device in accordance with the access schedule.

11. The IoT exchange hub of claim 9, wherein:
    the verifiable credential includes a privacy indicator having a value indicating a control stream or a data stream is not to be processed;
    the control stream source location or data sink location comprises a location of the IoT access customer agent; and
    the control stream sent by the IoT access customer agent to the IoT device or the data stream received from the IoT device is not processed by the IoT exchange hub.

12. The IoT exchange hub of claim 9, wherein:
    the verifiable credential includes a privacy indicator having a value indicating data stream postprocessing;
    the data sink location comprises a location for the IoT exchange hub;
    the IoT exchange hub receives data from the IoT device in response to the request to access the IoT device; and
    the instructions cause the one or more processors to postprocess the data stream received from the IoT device and to provide the postprocessed data stream to the IoT access customer agent.

13. The IoT exchange hub of claim 9, wherein:
    the verifiable credential includes a privacy indicator having a value indicating control stream preprocessing;
    the control stream source location comprises a location for the IoT exchange hub;
    the IoT exchange hub receives the control stream from the IoT access customer agent; and
    the instructions cause the one or more processors to preprocess a control stream received from the IoT device and to provide the preprocessed control stream to the IoT device.

14. An Internet of Things (IoT) device owner agent comprising:
    one or more processors; and
    a memory having instructions that, when executed, cause the one or more processors to:
      receive, from an IoT access customer agent, a request to access one or more IoT devices managed by the IoT device owner agent,
      request, from an IoT exchange hub in response to the request, an identifier for a verifiable credential,
      receive, from the IoT exchange hub, the identifier for the verifiable credential, and
      format the verifiable credential in accordance with one or more properties in the request to access the one or more IoT devices, wherein the verifiable credential comprises respective one or more decentralized identifiers identifying the one or more IoT devices.

15. The IoT device owner agent of claim 14, wherein the instructions cause the one or more processors to:
    request, from an authorizing party, a signature for the verifiable credential,
    receive, from the authorizing party, the signature for the verifiable credential,
    add the signature to the verifiable credential, and
    provide the verifiable credential to the IoT access customer agent.

16. A method comprising:
    receiving, by an Internet of Things (IoT) exchange hub from an IoT access customer agent, a verifiable credential in a request to access an IoT device, the request comprising a data stream request or a control stream request, wherein the verifiable credential comprises a decentralized identifier identifying the IoT access customer agent and a decentralized identifier identifying the IoT device;
    authenticating, by the IoT exchange hub, the decentralized identifier identifying the IoT access customer agent;
    verifying, by the IoT exchange hub, the verifiable credential; and
    in response to determining that the verifiable credential is valid and the decentralized identifier identifying the IoT access customer agent is authentic, providing, by the IoT exchange hub, a control stream source location or a data sink location to the IoT device associated with the decentralized identifier identifying the IoT device.

17. The method of claim 16, wherein the request to access the IoT device includes an access schedule, and further comprising providing the access schedule to the IoT device, wherein the IoT device responds to the request to access the IoT device in accordance with the access schedule.

18. The method of claim 16, wherein the request to access the IoT device includes an access schedule, and further comprising:

in response to determining that the IoT device cannot process the access schedule, obtaining, by the IoT exchange hub, data from the IoT device in accordance with the access schedule.

19. The method of claim 16, wherein the verifiable credential includes a privacy indicator having a value indicating data stream postprocessing, the data sink location comprises a location for the IoT exchange hub, and wherein the method further comprises:

receiving data from the IoT device in response to the request to access the IoT device;

postprocessing the data stream received from the IoT device to remove private information; and providing the postprocessed data stream to the IoT access customer agent.

20. The method of claim 16, wherein the verifiable credential includes a privacy indicator having a value indicating control stream preprocessing, wherein the control stream source location comprises a location for the IoT exchange hub, and wherein the method further comprises:

receiving a control stream from the IoT access customer agent;

preprocessing the control stream to remove private information; and providing the preprocessed control stream to the IoT device.

* * * * *